(12) United States Patent
Nakajima et al.

(10) Patent No.: US 7,436,477 B2
(45) Date of Patent: Oct. 14, 2008

(54) ACTIVE SUBSTRATE, DISPLAY APPARATUS AND METHOD FOR PRODUCING DISPLAY APPARATUS

(75) Inventors: Mutsumi Nakajima, Nara (JP); Ichirou Shiraki, Nara (JP); Osamu Sasaki, Nara (JP); Hironobu Tatsumi, Osaka (JP); Hirofumi Katsuse, Mie (JP); Masayuki Inoue, Mie (JP); Hideo Kasugai, Nara (JP); Keisuke Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 342 days.

(21) Appl. No.: 10/942,869

(22) Filed: Sep. 17, 2004

(65) Prior Publication Data

US 2005/0110929 A1 May 26, 2005

(30) Foreign Application Priority Data

| Sep. 19, 2003 | (JP) | ............................. 2003-329185 |
| Sep. 19, 2003 | (JP) | ............................. 2003-329186 |
| Apr. 22, 2004 | (JP) | ............................. 2004-127439 |

(51) Int. Cl.
*G02F 1/1333* (2006.01)

(52) U.S. Cl. ...................... 349/139; 349/54; 349/192; 349/42

(58) Field of Classification Search ............... 349/54, 349/192, 38, 42, 139
See application file for complete search history.

(56) References Cited

U.S. PATENT DOCUMENTS

| 5,392,143 | A | * | 2/1995 | Akiyama et al. ............... 349/55 |
| 5,600,460 | A | * | 2/1997 | Yamamoto et al. ............ 349/54 |
| 6,515,720 | B1 | | 2/2003 | Iizuka et al. |
| 6,839,099 | B2 | * | 1/2005 | Fukunishi ..................... 349/54 |
| 6,999,135 | B2 | * | 2/2006 | Chiang et al. .................. 349/43 |
| 7,034,903 | B2 | * | 4/2006 | Lee ............................... 349/40 |
| 2004/0036815 | A1 | * | 2/2004 | Kim et al. ....................... 349/38 |
| 2004/0169781 | A1 | * | 9/2004 | Lee et al. ........................ 349/54 |
| 2005/0116915 | A1 | * | 6/2005 | Nakajima et al. .............. 345/93 |

FOREIGN PATENT DOCUMENTS

| JP | 4-265943 | 9/1992 |
| JP | 4-278927 | 10/1992 |
| JP | 4-283729 | 10/1992 |
| JP | 10-161156 A | 6/1998 |
| JP | 11-305260 | 11/1999 |
| JP | 2001-056652 A | 2/2001 |
| KR | 2000-0011686 A | 2/2000 |

* cited by examiner

*Primary Examiner*—David C. Nelms
*Assistant Examiner*—Thanh-Nhan P Nguyen
(74) *Attorney, Agent, or Firm*—Birch, Stewart, Kolasch & Birch, LLP

(57) ABSTRACT

An active substrate is provided, which comprises a switching element comprising a first drive region and a second drive region, a signal line being connected to the first drive region, a pixel electrode connected to the second drive region, a first layer comprising at least one of a semiconductor material and a conductive material, and connected to the pixel electrode, a second layer comprising at least one of a semiconductor material and a conductive material, and connected to the signal line; and an insulating film provided between the first layer and the second layer. At least a portion of the first layer and at least a portion of the second layer overlap each other so that the first layer and the second layer are short-circuited by applying first energy to the insulating film.

41 Claims, 27 Drawing Sheets

Laser light

Laser light

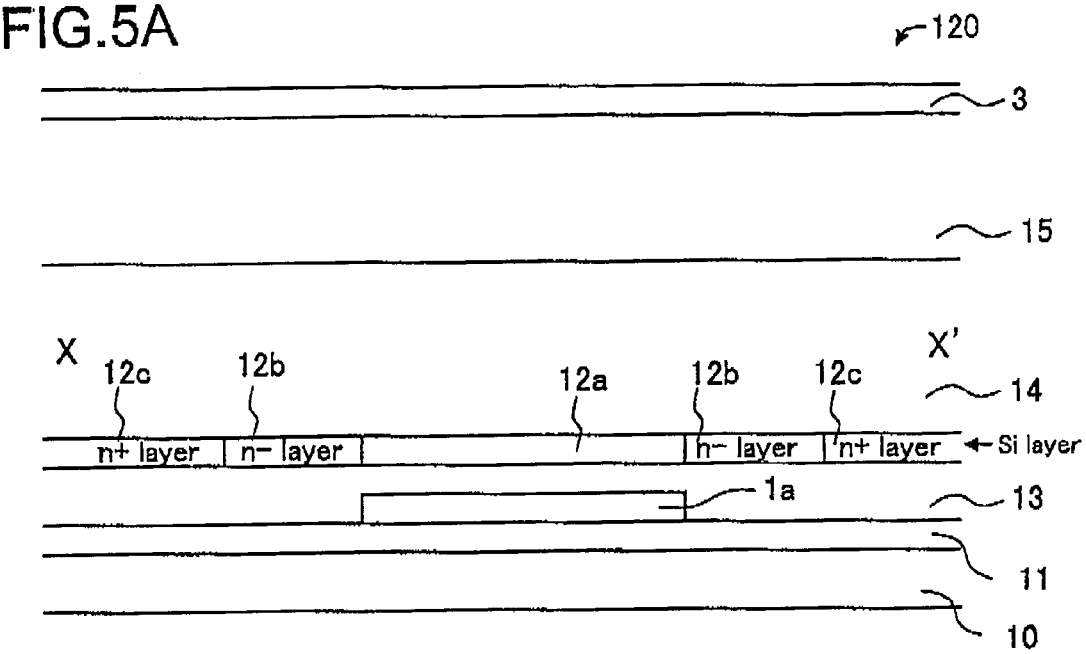
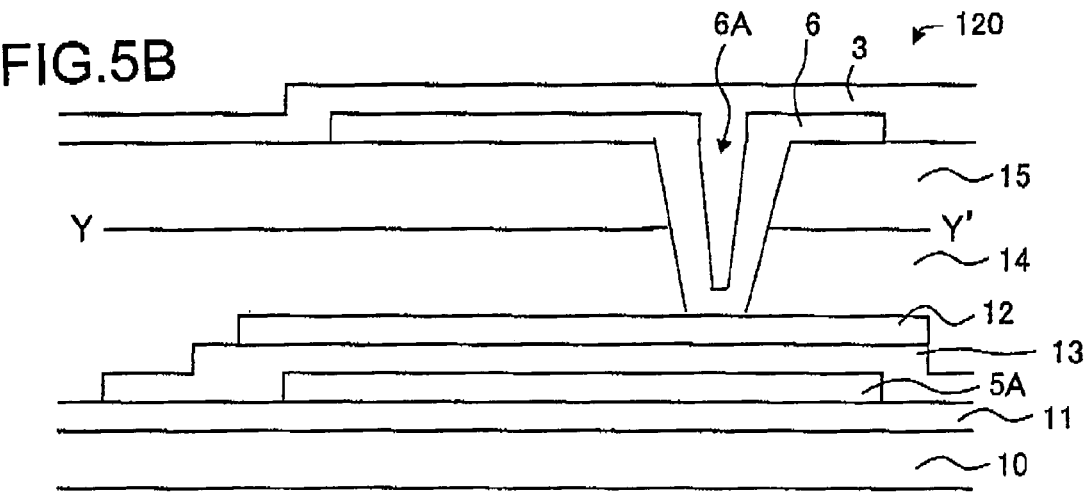

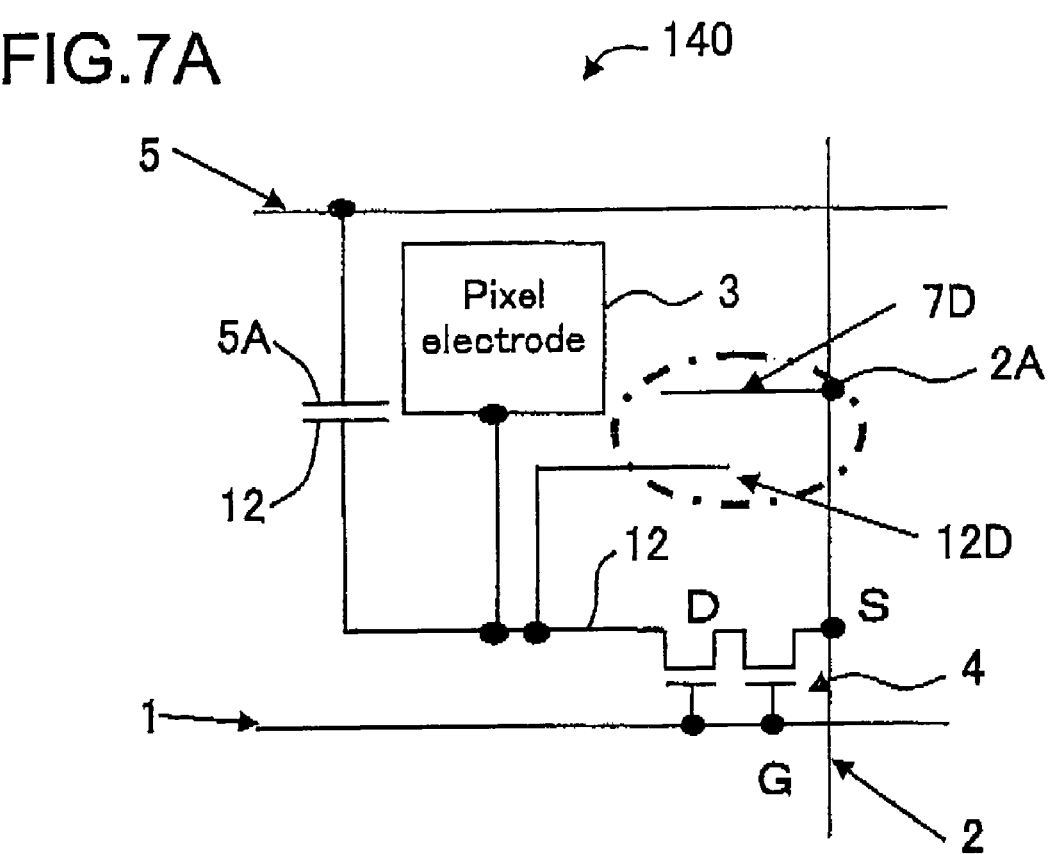

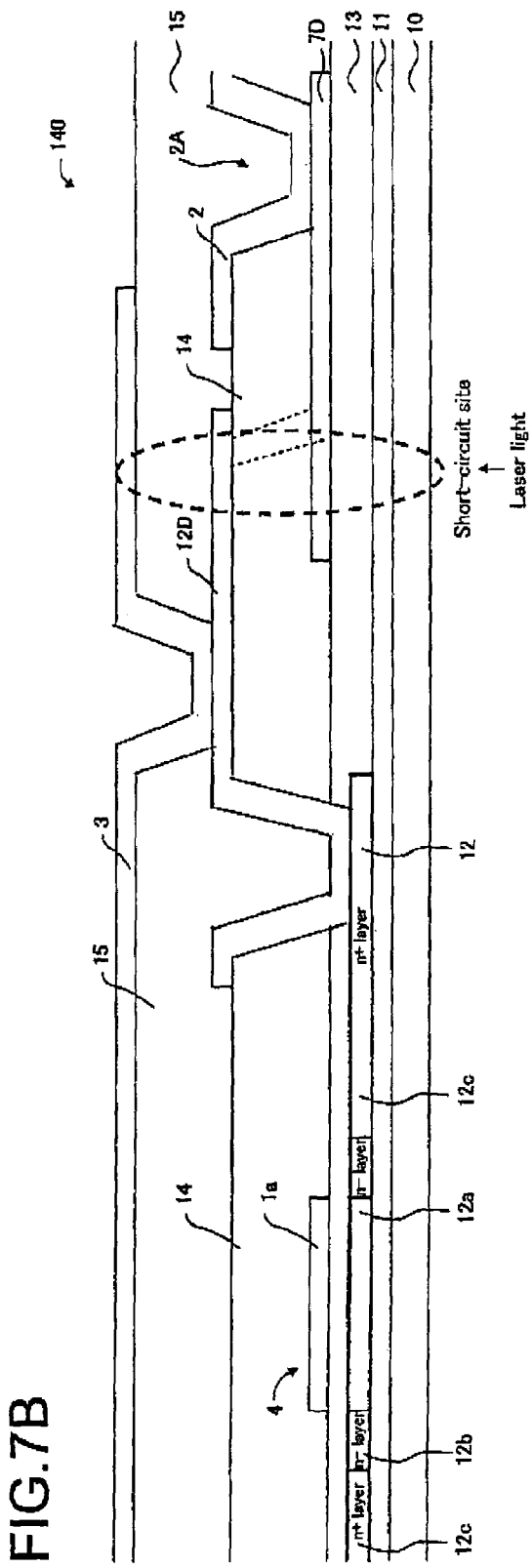

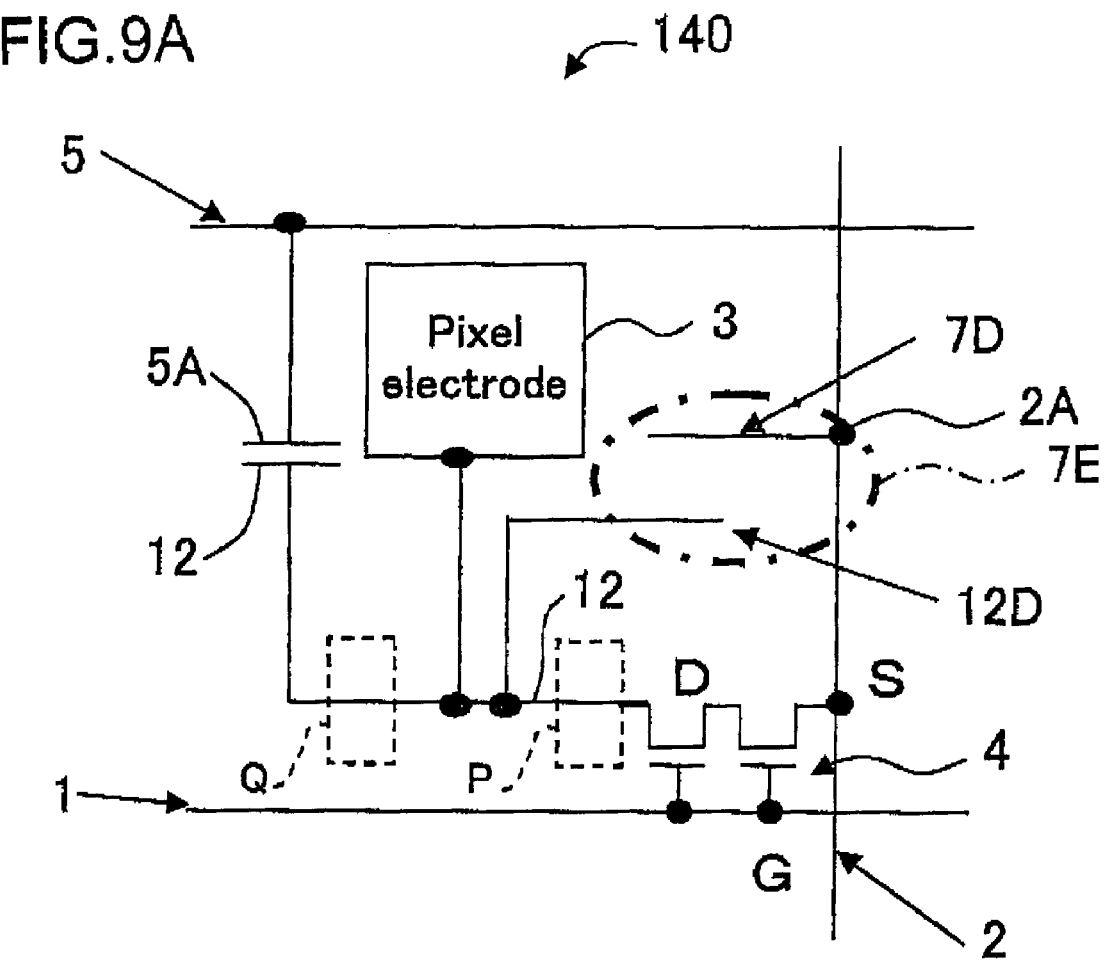

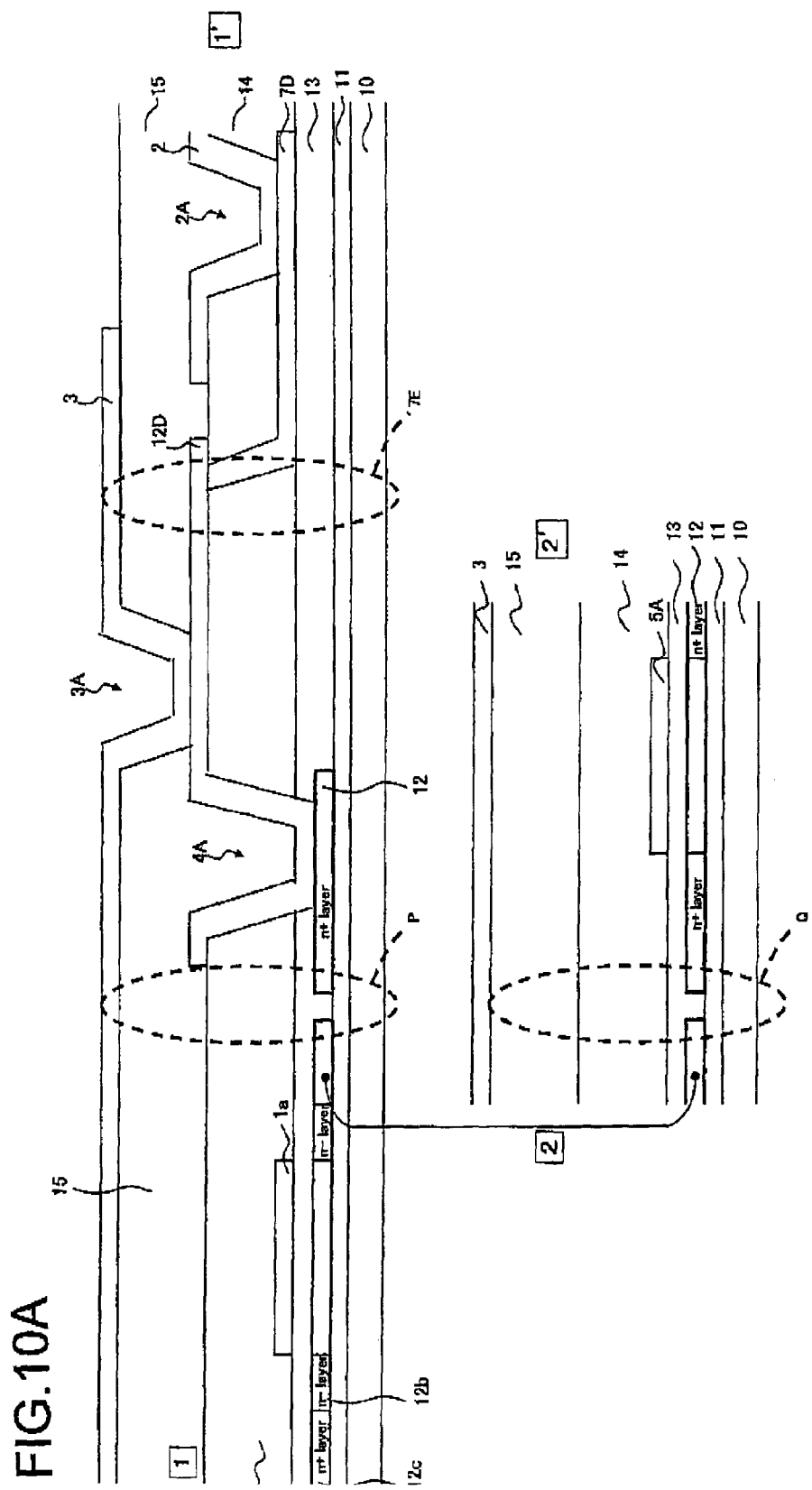

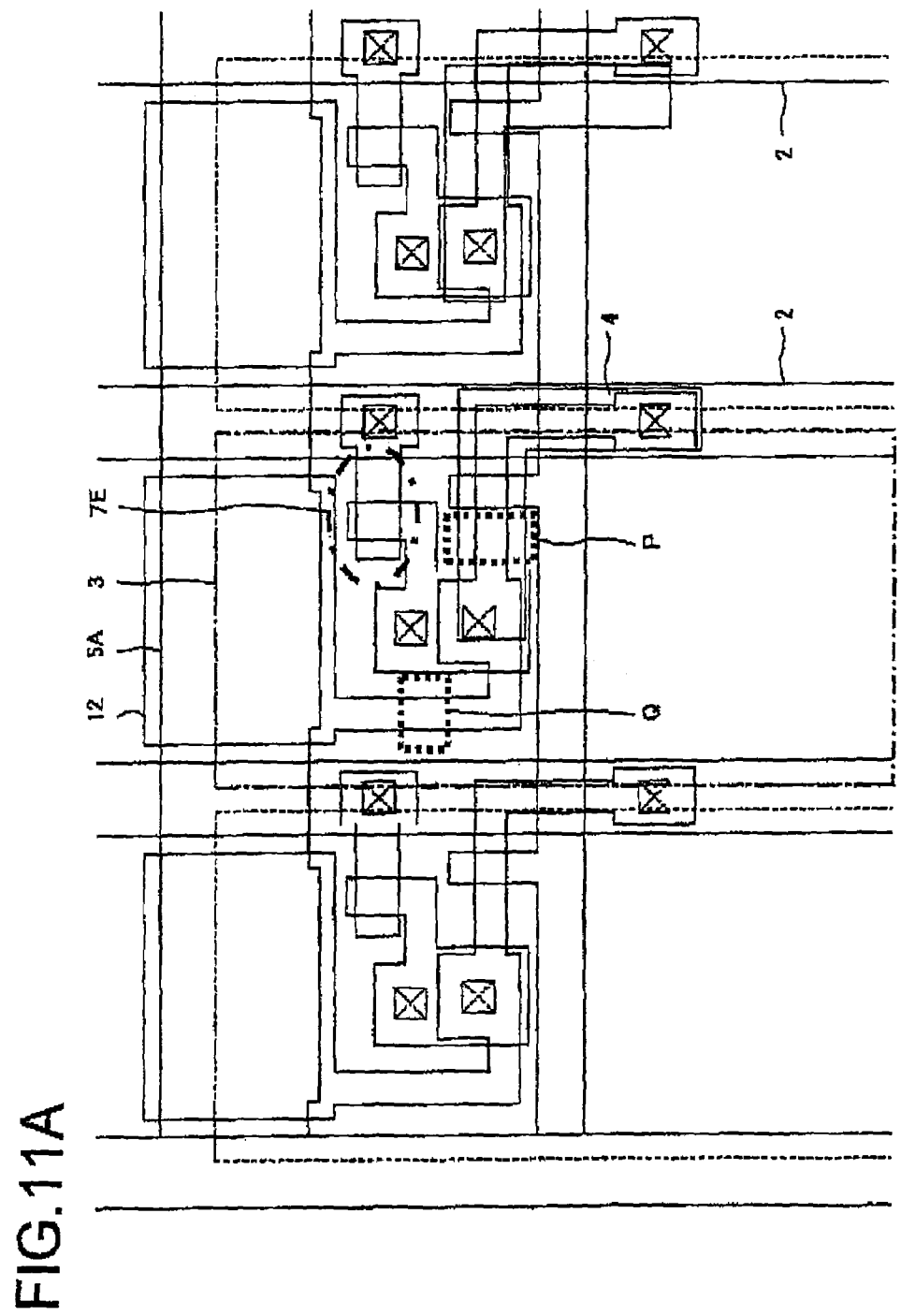

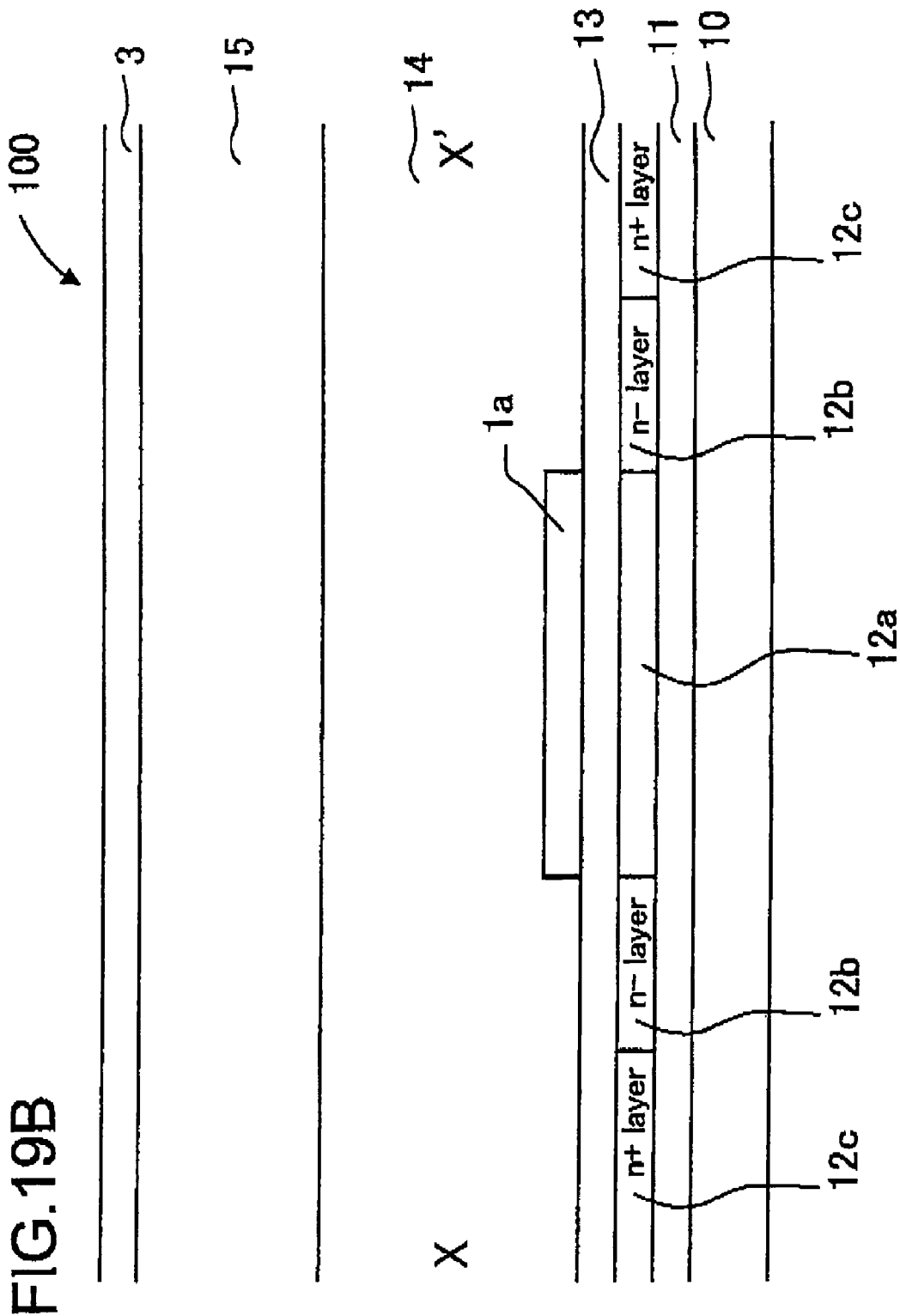

US 7,436,477 B2

ACTIVE SUBSTRATE, DISPLAY APPARATUS AND METHOD FOR PRODUCING DISPLAY APPARATUS

This non-provisional application claims priority under 35 U.S.C. §119(a) on Patent Application No.2003-329185 filed in Japan on Sep. 19, 2003, Patent Application No.2003-329186 filed in Japan on Sep. 19, 2003, and Patent Application No.2004-127439 filed in Japan on Apr. 22, 2004, the entire contents of which are hereby incorporated by reference.

BACKGROUND OF THE INVENTION

1. Field of the Invention

The present invention relates to a display apparatus, such as a liquid crystal display apparatus or the like, which comprises a plurality of display pixel electrodes two-dimensionally arranged, and a method for producing the same. The present invention also relates to an active substrate for use in the display apparatus.

2. Description of the Related Art

Conventionally, the above-described display apparatuses include, for example, liquid crystal display apparatuses as well as EL display apparatuses, plasma display apparatuses, and the like. For example, a plurality of pixel portions arranged in a matrix can be selectively driven to display a desired display pattern (image) on a display screen with high density.

As a technique of selecting the pixel portions, an active drive technique is known, in which: individually separated pixel electrodes are arranged in a matrix of columns and rows; a switching element is connected to each pixel electrode; and the pixel electrodes are selectively driven. Examples of a commonly used switching element for selectively selecting a plurality of pixel electrodes, include a TFT (thin film transistor) element, an MIM (metal-insulator-metal) element, a MOS transistor element, a diode, and the like. By using such a switching element to selectively drive the pixel electrodes, various display media, such as a liquid crystal, an EL light emitting layer, a plasma light emitting material, or the like, which is interposed between the pixel electrode and a counter electrode facing thereto, are driven optically, so that a display pattern may be viewed. Such an active drive technique is capable of high contrast display, and has been practically utilized in a liquid crystal televisions, computer terminal display apparatuses, and the like.

FIG. 19A is a top view showing a configuration of a basic unit on one of a pair of substrates, which is an active matrix substrate, in a conventional active type liquid crystal display apparatus. The substrates have a liquid crystal layer interposed between them. FIG. 19B is a cross-sectional view, taken along line X-X' in FIG. 19A, FIG. 19C is a cross-sectional view, taken along line Y-Y' of FIG. 19A.

In the conventional active type liquid crystal display apparatus of FIGS. 19A to 19C, the pair of substrates are an active matrix substrate 100 and a counter substrate, which face each other and have a liquid crystal layer (display medium) interposed between them. In the active matrix substrate 100, a plurality of gate bus lines 1 (scanning lines) are parallelly arranged in predetermined intervals on a glass substrate 10, extending horizontally in FIG. 19A, while a plurality of source bus lines 2 (signal lines) are parallelly arranged at predetermined intervals, extending vertically in FIG. 19A and intersecting the gate bus lines 1 (e.g., at right angles). Thus, the gate bus lines 1 and the source bus lines 2 are arranged in a grid (matrix). A pixel electrode 3 (a portion enclosed with a dashed line in FIG. 19A) made of a transparent electrode is provided in each region surrounded by adjacent gate bus lines 1 and adjacent source bus lines 2 (or at an intersection between the gate bus line 1 and the source bus line 2).

As shown in FIG. 19A, a dual-gate TFT 4 serving as a switching element is provided in a portion projecting from the gate bus line 1. The TFT 4 comprises a semiconductor layer made of silicon (Si), which is provided on the glass substrate 10 via a base coat film 11, as shown in the cross-sectional view of FIG. 19B taken along line X-X' of FIG. 19A. In this semiconductor layer, a channel region 12a, source/drain regions (e.g., an n+ Si layer) 12c, and an LDD region (e.g., an n– Si layer) 12b are provided. The source/drain regions 12c are formed by adding a high-concentration impurity to opposite sides of the channel region 12a. The LDD region 12b is formed by adding a low-concentration impurity between the channel region 12a and the source/drain regions 12c. A gate electrode 1a projecting (branching) from the gate bus line 1 is provided on the channel region 12a via a gate insulating film 13. Over the entire above-described structure, a pixel electrode 3 is provided via an interlayer film 14 and a resin layer 15. An alignment film (not shown) made of polyimide (PI) is provided on the pixel electrode 3. A liquid crystal layer is provided on and comes into contact with the alignment film (PI).

As shown in FIG. 19A, an additive-capacitor bus line (additive-capacitor line) 5 made of a metal layer (gate metal), which is patterned in the same step as that in which the gate bus line 1 is patterned, is disposed for each gate bus line 1 and in parallel to the gate bus line 1. A multilayer structure of the additive-capacitor portion is shown in the cross-sectional view of FIG. 19C taken along line Y-Y' of FIG. 19A. In the multilayer structure, a semiconductor layer (extending portion 12) extending from the drain region 12a of the TFT 4 is provided via the gate insulating film 13 below a broad-width portion 5A of the additive-capacitor bus line 5. The extending portion 12 of the semiconductor layer is connected to the pixel electrode 3 via a metal layer (source metal) 6, which is patterned in the same step as that in which the source bus line 2 is patterned, the connection is at a contact hole portion 6A which penetrates through the gate insulating film 13, the interlayer film 14 and the resin layer 15. As a result, the extending portion 12 (one additive-capacitor electrode) and the broad-width portion 5A (the other additive-capacitor electrode) face each other, having the gate insulating film 13 interposed between them. An additive capacitor is established between the extending portion 12 and the broad-width portion 5A.

In the thus-constructed conventional active type liquid crystal display apparatus, for example, when the TFT 4. (switching element) is a defective element, a signal voltage that should be otherwise input is not supplied to the pixel electrode 3 connected to the defective element. As a result, the user recognizes the defective element as a dot-like pixel defect (hereinafter referred to as a point defect) on a display screen. Such a point defect significantly impairs the display quality of a liquid crystal display apparatus, raising a problem with the production yield.

There are roughly two major reasons for the pixel defect.

One reason is that the defective TFT 4 prevents the pixel electrode 3 from being sufficiently charged by an image signal from the source bus line 2 within a time when the TFT 4 is selected by a scanning signal (signal from the gate bus line 1). Such a defect is hereinafter referred to as an ON defect). The other reason is that when the defective TFT 4 is not selected, charges on the pixel electrode 3 leak due to the defective TFT 4. Such a defeat is hereinafter referred to as an OFF defect.

The ON defect is caused by a defect of the TFT 4 (switching element), while the OFF defect can have two causes: electrical leakage through the TFT 4 (switching element); and electrical leakage between the pixel electrode 3 and the bus lines 1 and 2. In either case of the ON defect or the OFF defect, a voltage applied between the pixel electrode 3 and the counter electrode (not shown) no longer reaches a required display voltage value. Therefore, a pixel defective portion is viewed as a luminous point in the normally white mode (a display mode in which the light transmittance is maximized when a voltage applied to a liquid crystal layer is zero), while a pixel defective portion is viewed as a black point in the normally black mode (a display mode in which the light transmittance is minimized when a voltage applied to a liquid crystal layer is zero).

Such a point defect can be visually detected by an inspector as follows. When a counter substrate having a counter electrode is attached to the active matrix substrate 100 having the TFT 4 (switching element) and a gap therebetween is filled with liquid crystal, a predetermined electric signal (detection signal) is applied to both of the bus lines 1 and 2, so that a point defect may be seen by the inspector. Such a point defect can be repaired by, for example, short-circuiting the source bus line 2 and the pixel electrode 3 no matter whether or not the gate bus line 1 is selected. In this case, a signal voltage supplied from the source bus line 2 is used to charge and discharge the pixel electrode 3.

However, in the conventional example of FIGS. 19A to 19C, it is difficult to perform the above-described repair due to the arrangement of the source bus line 2 and the pixel electrode 3. As a result, a product having many point defects must be discarded, leading to poor production yield and high production cost.

A liquid crystal display apparatus in which repair of such a point defect is possible has been proposed in Japanese Laid-Open Publication No. 4-265943. The liquid crystal display apparatus of Japanese Laid-Open Publication No. 4-265943 will be described with reference to FIGS. 20A and 20B.

FIG. 20A is a top view showing an exemplary structure of a basic unit in an active matrix substrate, which is one of a pair of substrates facing each other and having a liquid crystal layer interposed between them, in a conventional active type liquid crystal display apparatus. FIG. 20B is an enlarged view showing the portion enclosed by a circle in FIG. 20A. Note that parts of FIG. 20A having substantially the same functions and effects as those of FIG. 19A are indicated by the same reference numerals and will not be explained in detail.

As shown in FIG. 20A, the active type liquid crystal display apparatus comprises: a gate bus line projecting portion 21 projecting from a gate bus line 1 toward the inside of a pixel electrode 3; and a source bus line projecting portion 22 projecting from a source bus line 2 toward the inside of the pixel electrode 3. The projecting portions 21 and 22 overlap each other via an insulating film. A conductor piece 23 is provided at a tip portion of the gate bus line projecting portion 21 via the insulating film. While the conductor piece 23 is electrically connected to the pixel electrode 3, the gate bus line projecting portion 21 is not electrically connected with the pixel electrode 3 due to the insulating film. Also, the source bus line projecting portion 22 is not electrically connected with the gate bus line projecting portion 21 due to the insulating film.

For a pixel portion in which a point defect has been detected, a root portion of the gate bus line projecting portion 21 is irradiated with laser to electrically separate (cut) the gate bus line projecting portion 21 from the gate bus line 1 to achieve insulation, as shown in a portion A enclosed with a dashed line in FIG. 20B. Next, in a portion B enclosed with a dashed line, the insulating film between the source bus line projecting portion 22 and the gate bus line projecting portion 21 is destroyed by laser irradiation to short-circuit the source bus line projecting portion 22 and the gate bus line projecting portion 21. Further, in a portion C enclosed with a dashed line, the insulating film between the gate bus line projecting portion 21 and the conductor piece 23 connected to the pixel electrode 3 is destroyed by laser irradiation to short-circuit the gate bus line projecting portion 21 and the conductor piece 23. By performing laser irradiation three times, electric conduction is established between the source bus line 2 and the pixel electrode 3, so that the defective pixel has an average luminosity of all pixels, i.e., the point defeat is repaired.

Japanese Laid-Open Publication No. 4-278927 discloses a liquid crystal display apparatus in which is possible of a defective pixel caused by a defect, such as a pinhole or the like, which occurs in an additive-capacitor electrode 5B (FIG. 21). The active type liquid crystal display apparatus of Japanese Laid-Open Publication No. 4-278927 will be described below with reference to FIG. 21.

FIG. 21 is a top view showing an exemplary structure of a basic unit in an active matrix substrate, which is one of a pair of substrates facing each other and having a liquid crystal layer interposed between them, in another conventional active type liquid crystal display apparatus. Note that parts of FIG. 21 having substantially the same functions and effects as those of FIG. 19A are indicated by the same reference numerals and will not be explained in detail.

In the active type liquid crystal display apparatus of FIG. 21, an additive-capacitor bus line 5 is provided adjacent to a pixel electrode 3 and parallel to a gate bus line 1. A portion facing the TFT 4 formation portion of the additive-capacitor bus line 5 overlaps an end portion of a first conductor 25 via an insulating film. The other end portion of the first conductor 25 overlaps an end portion of a second conductor 26 via a gate insulating film, the end portion of a second conductor 26 being disposed under the other end portion of the first conductor 25. An end portion of a projecting portion 27 of the source bus line 2 overlaps the other end portion of the second conductor 26 via the gate insulating film, the end portion of a projecting portion 27 of the source bus line 2 being disposed over the other end portion of the second conductor 26. The additive-capacitor electrode 5B (hatched portion) facing the additive-capacitor bus line 5 is connected to the pixel electrode 3 over the first conductor 25.

By irradiating a basic portion of the first conductor 25, the overlapping portion of the first conductor 25 and the second conductor 26, and the overlapping portion of the second conductor 26 and the projecting portion 27 of the source bus line 2 with laser light through a glass substrate, the source bus line 2 and the pixel electrode 3 are short-circuited and the additive-capacitor electrode 5B is cut off from the pixel electrode 3, thereby repairing a defective pixel portion.

However, the above-described active type liquid crystal display apparatus of Japanese Laid-Open Publication No. 4-265943 requires performing laser irradiation three times: (1) laser irradiation (the portion A indicated with a dashed line) for electrically separating the gate bus line projecting portion 21 from the gate bus line 1 in order to short-circuit the source bus line 2 and the pixel electrode 3 to repair a defective pixel portion caused by a defective TFT; (2) laser irradiation (the portion B indicated with a dashed line) for short-circuiting the gate bus line projecting portion 21 and the source bus line projecting portion 22; and (3) laser irradiation (the portion C indicated with a dashed line) for short-circuiting the gate bus line projecting portion 21 and the pixel electrode 3. Therefore, it is difficult to repair a defective pixel portion caused by a defective TFT. In addition, the defective TFT cannot be cut off from the pixel electrode 3, and therefore, it is not possible to perform repair depending on the type of pixel defect.

In the above-described active type liquid crystal display apparatus of Japanese Laid-Open Publication No. 4-278927, a defective pixel portion caused by the defect of the additive-capacitor electrode 5B is repaired by performing laser irradiation two times to short-circuit the source bus line 2 and the pixel electrode 3 and performing laser irradiation once to cut off the pixel electrode 3 from the additive-capacitor electrode 5B. Thus, although the pixel electrode 3 is cut off from the additive-capacitor electrode 5B, it is difficult to repair a defective pixel portion caused by a defective additive-capacitor portion.

SUMMARY OF THE INVENTION

According to an aspect of the present invention, an active substrate is provided, which comprises: a switching element comprising a first drive region and a second drive region, a signal line being connected to the first drive region; a pixel electrode connected to the second drive region; a first layer comprising at least one of a semiconductor material and a conductive material, and connected to the pixel electrode; a second layer comprising at least one of a semiconductor material and a conductive material, and connected to the signal line; and an insulating film provided between the first layer and the second layer. At least a portion of the first layer and at least a portion of the second layer overlap each other so that the first layer and the second layer are short-circuited by applying first energy to the insulating film.

In one embodiment of this invention, the active substrate may further comprise a scanning line intersecting the signal line. The switching element may further comprise a control region connected to the scanning line.

In one embodiment of this invention, the active substrate may further comprise a first contact hole portion for connecting the second drive region and the pixel electrode.

In one embodiment of this invention, the active substrate may further comprise: a first contact hole portion for connecting the second drive region and the first layer; and a second contact hole portion for connecting the first layer and the pixel electrode.

In one embodiment of this invention, the active substrate may further comprise an additive-capacitor line. The second drive region may comprise an extending portion extending from the switching element. At least a portion of the extending portion and a portion of the additive-capacitor line may face each other.

In one embodiment of this invention, the active substrate may further comprise a second contact hole portion for connecting the second layer and the signal line.

In one embodiment of this invention, the active substrate may further comprise a third contact hole portion for connecting the second layer and the signal line.

In one embodiment of this invention, the second drive region may comprise an extending portion extending from the switching element. The first layer may be project beyond the extending portion.

In one embodiment of this invention, the first layer may be a conductive material layer.

In one embodiment of this invention, the insulating film may be a gate insulating film.

In one embodiment of this invention, the insulating film may be an interlayer film.

In one embodiment of this invention, the active substrate may further comprise a scanning line intersecting the signal line. A material for the second layer may be the same as a material for the scanning line.

In one embodiment of this invention, a portion of the first layer and a portion of the second layer may be project beyond an overlapping portion of the first layer and the second layer.

In one embodiment of this invention, the switching element may be one of a thin film transistor element, an MIM element, a MOS transistor element, and a diode.

In one embodiment of this invention, the thin film transistor element may be a polycrystalline silicon thin film transistor.

In one embodiment of this invention, the thin film transistor element may have a top gate structure.

In one embodiment of this invention, the thin film transistor element may have a bottom gate structure.

In one embodiment of this invention, at least one of the first layer and the second layer may comprise semiconductor silicon.

In one embodiment of this invention, at least one of the first layer and the second layer may be made of a metal material, an alloy material and a compound material including at least one element of Ta, W, Ti, Mo, Al and Cu.

In one embodiment of this invention, the second drive region and the first layer may be integrated with each other.

In one embodiment of this invention, the active substrate may further comprise: an additive-capacitor portion connected to the pixel electrode; and at least one of a first disconnect site and a second disconnect site. The second drive region and the pixel electrode may be electrically separated from each other by applying second energy to the first disconnect site. The additive-capacitor portion and the pixel electrode may be electrically separated from each other by applying third energy to the second disconnect site.

In one embodiment of this invention, the active substrate may further comprise a scanning line intersecting the signal line. A material for the first layer may be the same as a material for the signal line. A material for the second layer may be the same as a material for the scanning line.

In one embodiment of this invention, the active substrate may further comprise a scanning line intersecting the signal line. At least a portion of the switching element may overlap the signal line. An intersecting region of the scanning line with the signal line may also serve as a gate region of the switching element.

In one embodiment of this invention, the switching element may be in the shape of an L. A first portion of the switching element may overlap the signal line. A second portion of the switching element may overlap the pixel electrode.

In one embodiment of this invention, the active substrate may further comprise at least one of a first contact hole portion for connecting the first layer and the pixel electrode and a second contact hole portion for connecting the second layer and the signal line.

In one embodiment of this invention, the pixel electrode may comprise a transparent conductive film having a slit. A portion of at least one of the first layer and the second layer may overlap the slit.

In one embodiment of this invention, a portion of the first layer may overlap the slit. A distance between a center line of the portion of the first layer and a center line of the slit may be within a range between 0 μm to 3 μm, inclusive.

In one embodiment of this invention, a portion of the second layer may overlap the slit. A distance between a center line of the portion of the second layer and a center line of the slit may be within a range between 0 µm to 3 µm, inclusive.

In one embodiment of this invention, a center line of a portion of at least one of the first layer and the second layer may coincide with a center line of the slit.

In one embodiment of this invention, the pixel electrode may comprise a plurality of electrodes. A portion of at least one of the first layer and the second layer may overlap at least one of the plurality of electrodes.

In one embodiment of this invention, a portion of the first layer may overlap a predetermined electrode of the plurality of electrodes. A distance between a center line of the portion of the first layer and a center line of the predetermined electrode may be within a range between 0 µm to 3 µm, inclusive.

In one embodiment of this invention, a portion of the second layer may overlap a predetermined electrode of the plurality of electrodes. A distance between a center line of the portion of the second layer and a center line of the predetermined electrode may be within a range between 0 µm to 3 µm, inclusive.

In one embodiment of this invention, a center line of a portion of at least one of the first layer and the second layer may coincide with a center line of the predetermined electrode of the plurality of electrodes.

According to another aspect of the present invention, a display apparatus is provided, which comprises: an active substrate; a counter substrate provided facing the active substrate; and a display medium provided between the active substrate and the counter substrate. The active substrate comprises: a switching element comprising a first drive region and a second drive region, a signal line being connected to the first drive region; a pixel electrode connected to the second drive region; a first layer containing at least one of a semiconductor material and a conductive material, and connected to the pixel electrode; a second layer containing at least one of a semiconductor material and a conductive material, and connected to the signal line; and an insulating film provided between the first layer and the second layer. At least a portion of the first layer and at least a portion of the second layer overlap each other so that the first layer and the second layer are short-circuited by applying first energy to the insulating film.

In one embodiment of this invention, when it is determined that light output from the display apparatus via the pixel electrode is not normal, a short circuit may be caused between the first layer and the second layer.

In one embodiment of this invention, the display medium may be one of a liquid crystal, an EL light emitting layer, and a plasma light emitting material.

According to another aspect of the present invention, a method is provided for producing a display apparatus. The display apparatus comprises: an active substrate; a counter substrate provided facing the active substrate; and a display medium provided between the active substrate and the counter substrate. The active substrate comprises: a switching element comprising a first drive region and a second drive region, a signal line being connected to the first drive region; a pixel electrode connected to the second drive region; a first layer containing at least one of a semiconductor material and a conductive material, and connected to the pixel electrode; a second layer containing at least one of a semiconductor material and a conductive material, and connected to the signal line; and an insulating film provided between the first layer and the second layer. At least a portion of the first layer and at least a portion of the second layer overlap each other so that the first layer and the second layer are short-circuited by applying first energy to the insulating film. The method comprising the steps of: determining whether or not light output from the display apparatus via the pixel electrode is normal; and short-circuiting the first layer and the second layer by applying the first energy to the insulating film when it is determined that the output light is not normal.

In one embodiment of this invention, a portion of the first layer and a portion of the second layer may be project beyond an overlapping portion of the first layer and the second layer. In the short-circuiting step, an amount of energy applied to the portions of the first layer and the second layer projecting beyond the overlapping portion may be larger than an amount of energy applied to the overlapping portion.

In one embodiment of this invention, the first energy may be at least a portion of energy of laser light.

In one embodiment of this invention, the active substrate may further comprise: an additive-capacitor portion connected to the pixel electrode; and at least one of a first disconnect site and a second disconnect site. The second drive region and the pixel electrode may be electrically separated from each other by applying second energy to the first disconnect site. The additive-capacitor portion and the pixel electrode may be electrically separated from each other by applying third energy to the second disconnect site. The method may further comprise at least one of the steps of applying the second energy to the first disconnect site and applying the third energy to the second disconnect site, when it is determined that the output light is not normal.

In one embodiment of this invention, the switching element may be formed using the same material and in the same step as those of switching elements contained in a scanning line drive section and a signal line drive section.

According to the present invention, on an active substrate which is one of a pair of substrates facing each other and having a display medium interposed between them, a first layer (e.g., a first projecting portion) of a semiconductor layer constituting a drive region (drain electrode) of a switching element or a conductive material layer connected to the semiconductor layer, at least partially overlaps, via an insulator layer, a second layer (second projecting portion) made of a conductive material layer or a semiconductor layer connected to a signal line (source bus line). Alternatively, a first layer made of a conductive material layer or a semiconductor layer connected to a pixel electrode via a contact hole portion and not connected to a switching element, at least partially overlaps, via an insulating film, a second layer made of a conductive, material layer or a semiconductor layer connected to a signal line (source bus line). In addition, an additive-capacitor disconnect site or a drain electrode disconnect site for a switching element is provided as a disconnect site for repairing the type of a pixel defect.

The active substrate and the counter substrate are attached together. A display medium, such as a liquid crystal layer or the like, is sandwiched between the two substrates. Thereafter, an appropriate drive signal is applied to the pixel electrode and the counter electrode via the gate bus line and the source bus line, so that a predetermined display pattern is displayed on a display screen. By viewing the display screen, a point defect (defective pixel) can be detected visually by a human.

For a pixel portion having a detected point defect, laser radiation is applied to an overlapping portion of the first projecting portion and the second projecting portion from a rear side of the substrate. Thereby, an insulating film interposed between the first projecting portion and the second projecting portion is destroyed, so that the first projecting portion and the second projecting portion are short-circuited.

As a result, the pixel electrode and the source bus line (signal line) are electrically connected to each other.

For a pixel portion having a detected point defect in an additive-capacitor, laser radiation is applied to an overlapping portion of the first layer and the second layer from a rear side of the substrate. In addition, laser irradiation is applied to the additive-capacitor disconnect site. For a pixel portion having a detected point defect in a switching element, laser irradiation is applied to an overlapping portion of the first layer and the second layer. In addition, laser irradiation is applied to the drain electrode disconnect site. For a pixel portion having detected point defects in an additive-capacitor and a switching element, laser irradiation is applied to an overlapping portion of the first layer and the second layer. In addition, laser irradiation is applied to the drain electrode disconnect site and the additive-capacitor disconnect site.

As a result, the insulating film interposed between the first layer and the second layer is destroyed, so that the first layer and the second layer are short-circuited. Thus, the pixel electrode and the source bus line (signal line) are electrically connected. In addition, an additive-capacitor or a switching element, which has a defect, is cut off from the pixel electrode, depending on the type of a pixel defect.

As a result, the source bus line (signal line) and the pixel electrode are short-circuited, so that a source signal on the source bus line is input directly to the pixel electrode. In addition, when the additive-capacitor disconnect site is disconnected, the pixel electrode and the source bus line additive-capacitor are not influenced by the defect. When the drain electrode disconnect site is disconnected, the pixel electrode and the source bus line switching element are not influenced by the defect. As a result, the defective pixel portion is displayed as neither a complete luminous point nor a complete black point. Therefore, a defective pixel portion, which has been subjected to the above-described repair treatment, is not easily recognized visually as a defect, though it does not work normally. Therefore, such a defective pixel can be said to be a normal pixel in terms of screen display.

The present invention does not require performing laser irradiation three times as in the conventional technique shown in Japanese Laid-Open Publication No. 4-265943. In the present invention, a pixel defect can be easily repaired by performing laser irradiation once. The production yield is improved. Further, according to the present invention, a pixel defect can be repaired by performing laser irradiation a smaller number of times, depending on the type of the defect. The production yield is improved.

In the conventional technique disclosed in Japanese Laid-Open Publication No. 4-265943, when an amorphous silicon TFT is used as a switching element, a distance between a gate bus line and a source bus line and a distance between a gate bus line and a conductor piece are each about 300 nm. In contrast, in the present invention, when a polycrystalline silicon TFT is used, a distance between a second projecting portion connected to a source bus line via a contact hole portion (e.g., when the same metal layer as a gate line is used, the projection region is hereinafter referred to as a gate metal projecting portion) and a first projecting portion connected to a semiconductor layer constituting a drive region (drain region) (e.g., when the same layer as the semiconductor layer is used, the projection portion is hereinafter referred to as a semiconductor layer projecting portion) is about 100 nm (the thickness of a gate insulating film in Embodiments 1 to 3). Therefore, a distance between the first projecting portion and the second projecting portion can be small. Therefore, the power of laser radiation is reduced. It is possible to suppress a defect which occurs when the laser power is otherwise great.

As the thickness of an insulating film to be destroyed is increased, the power of laser power required for short-circuiting is increased. If laser power is increased, an adverse influence of laser irradiation is increased, so that a semiconductor layer or a metal layer is likely to be scattered around the laser spot R. When other elements are disposed within a range of the influence, a defect may occur. Therefore, a defect due to laser irradiation can be suppressed in the present invention as compared to Japanese Laid-Open Publication No. 4-265943, since the thickness of the insulating film is smaller.

By causing the first projecting portion and the second projecting portion to project from the overlapping portion, the alignment accuracy of laser radiation can be improved when repair is performed.

It is assumed that laser radiation is applied to a middle portion of an overlapping portion of the first projecting portion and the second projecting portion. In this case, for example, when the first projecting portion or the second projecting portion is made of a semiconductor layer, the semiconductor layer exists in the entire laser spot. Most of the laser power is absorbed by the semiconductor layer. Therefore, laser irradiation is applied to a corner portion of an overlapping portion of the first projecting portion and the second projecting portion (a corner portion including the two projecting portions and the overlapping portion), so that a portion projecting from the overlapping portion of the first projecting portion and the second projecting portion is included in the laser spot. As a result, laser power can also be applied to the two projecting portions, so that short-circuiting can be more easily achieved with a smaller level of power. Japanese Laid-Open Publication No. 2001-264800 discloses that a corner portion of a superposition region of a first conductive layer and a second conductive layer is melted and fused by laser in order to avoid line disconnection due to fluctuation of laser irradiation width. This feature is totally different from the above-described feature of the present invention.

When polycrystalline silicon is used as a semiconductor layer of a switching element, an off current is larger than when amorphous silicon is used. Therefore, typically, a switching element having dual gates or triple gates is formed. In this case, the probability of occurrence of a defect in a switching element is increased. Therefore, by providing a drain electrode disconnect site in a switching element comprising polycrystalline silicon as a semiconductor layer, it is possible to prevent the influence of a pixel electrode and a source bus line when a defect exists in the switching element.

According to the present invention, a pixel defect can be more easily repaired by irradiation of energy (e.g., laser light, etc.) from outside of a substrate. Therefore, a display apparatus can be produced with high yield, leading to a reduction in cost of the display apparatus.

According to the present invention, when a point defect is detected in an additive-capacitor or a switching element, laser radiation is applied to an overlapping portion of the first layer and the second layer from outside of the substrate. In other words, laser radiation is applied to a disconnect site for the additive-capacitor or the switching element to remove the influence thereof. In this case, performing laser irradiation a smaller number of times is required. As a result, a pixel defect can be easily repaired depending on the type of the defect, so that the influence of the defect is removed and the point defect is not easily recognized. The production yield can be improved.

Thus, the invention described herein makes possible the advantages of providing: (1) an active substrate, in which the defect of a pixel portion can be easily repaired depending on the type of the defect so that the defective pixel cannot be easily recognized and the production yield can be improved; (2) a display apparatus comprising the active substrate; and a method for producing the display apparatus.

These and other advantages of the present invention will become apparent to those skilled in the art upon reading and understanding the following detailed description with reference to the accompanying figures.

BRIEF DESCRIPTION OF THE DRAWINGS

FIG. 2A shows a laser spot R of laser radiation for repairing a defect located at a corner portion.

FIG. 5A is a cross-sectional view, taken along line X-X' in FIG. 4A.

FIG. 5B is a cross-sectional view, taken along line Y-Y' of FIG. 4A.

FIG. 7A is a circuit diagram schematically showing an exemplary configuration of a basic unit on an active matrix substrate in an active type liquid crystal display apparatus according to Embodiment 4 of the present invention.

FIG. 7B is a cross-sectional view showing a switching element portion and a source bus line short-circuit portion of FIG. 7A.

FIG. 9A is a circuit diagram showing an exemplary structure of a basic unit in an active matrix substrate in an active type liquid crystal display apparatus according to Embodiment 5 of the present invention.

FIG. 10A is a cross-sectional view schematically showing a state of the active matrix substrate of FIG. 9B after laser irradiation.

FIG. 11A is a top view showing a configuration of a portion of the active matrix substrate of FIG. 9A.

FIG. 19B is a cross-sectional view, taken along line X-X' of FIG. 19A.

DESCRIPTION OF THE PREFERRED EMBODIMENTS

Hereinafter, an active type liquid crystal display apparatus comprising an active matrix substrate and a method for producing the same according to embodiments of the present invention will be described with reference to the accompanying drawings. As used herein, the term "connect" or "connection" in relation to two elements refers to either direct connection of the two elements or indirect connection of the two elements via at least another element.

Embodiment 1

Figure 1A:
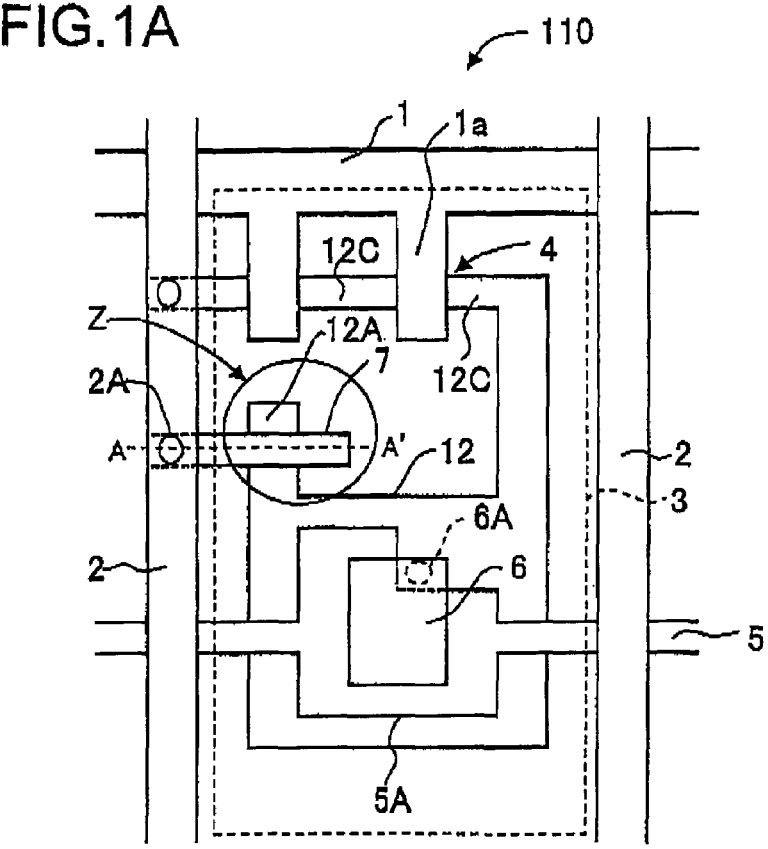
FIG. 1A is a top view showing an exemplary structure of a basic unit in an active matrix substrate, which is one of a pair of substrates facing each other and having a liquid crystal layer interposed between them, in an active type liquid crystal display apparatus according to Embodiment 1 of the present invention.
Figure 1B:
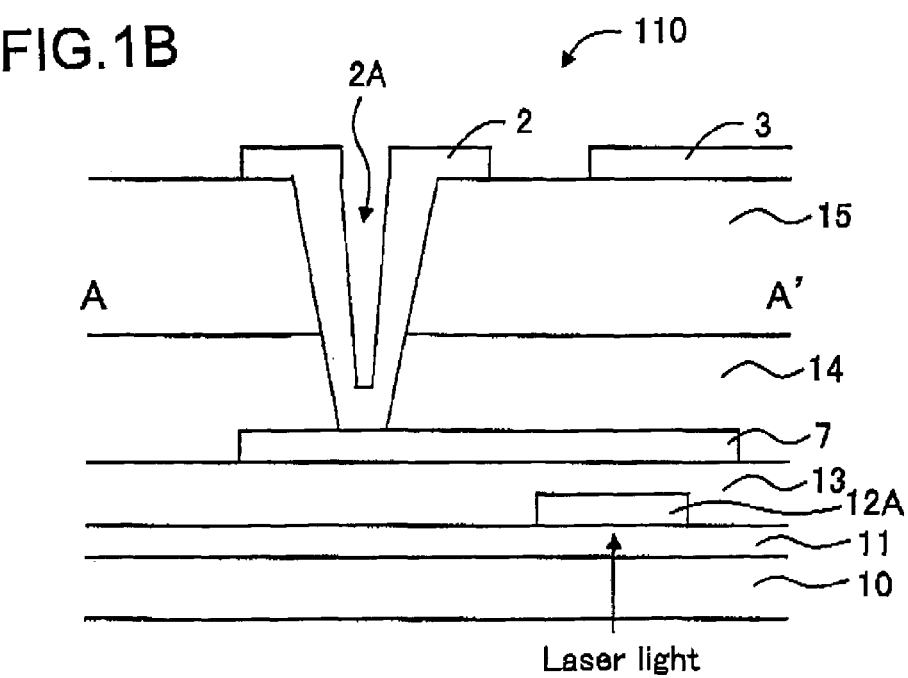
FIG. 1B is a cross-sectional view, taken along line A-A' of FIG. 1A.
Figure 13:
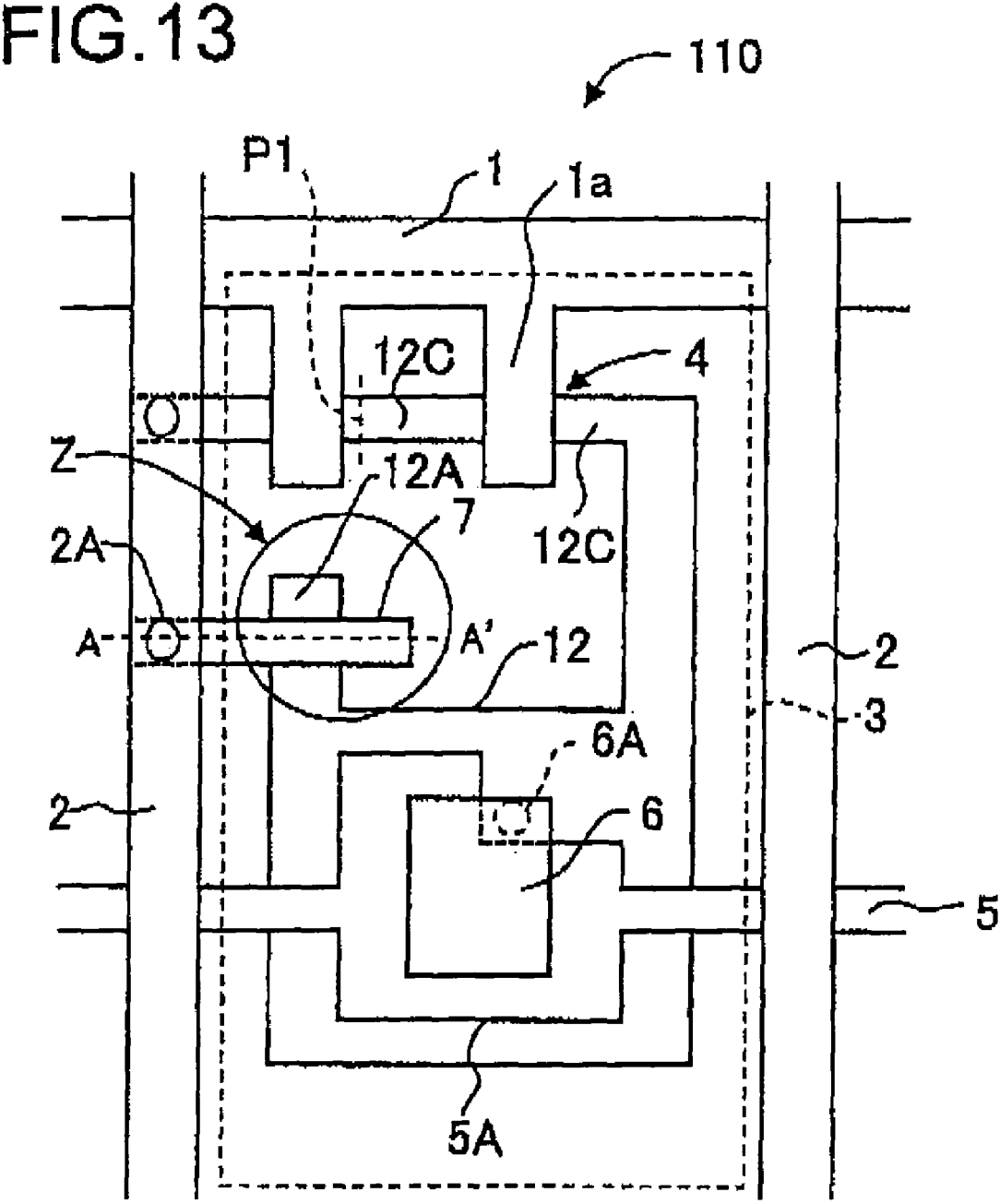
FIG. 13 is a top view showing an exemplary structure of a basic unit in an active matrix substrate in an active type liquid crystal display apparatus according to Embodiment 6 of the present invention.
Figure 19A:
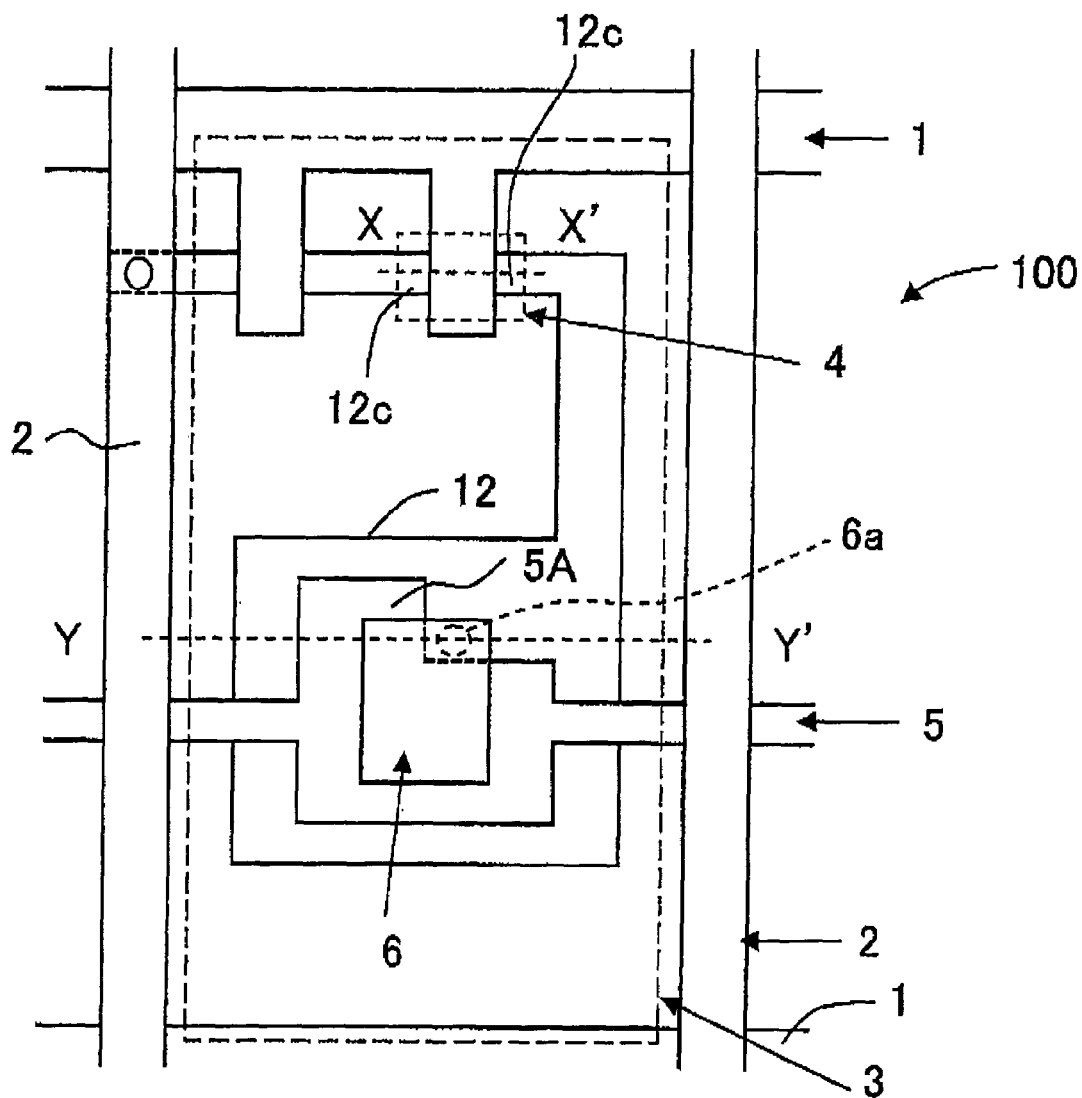
FIG. 19A is a top view showing an exemplary structure of a basic unit in an active matrix substrate in a conventional active type liquid crystal display apparatus.
Figure 19C:
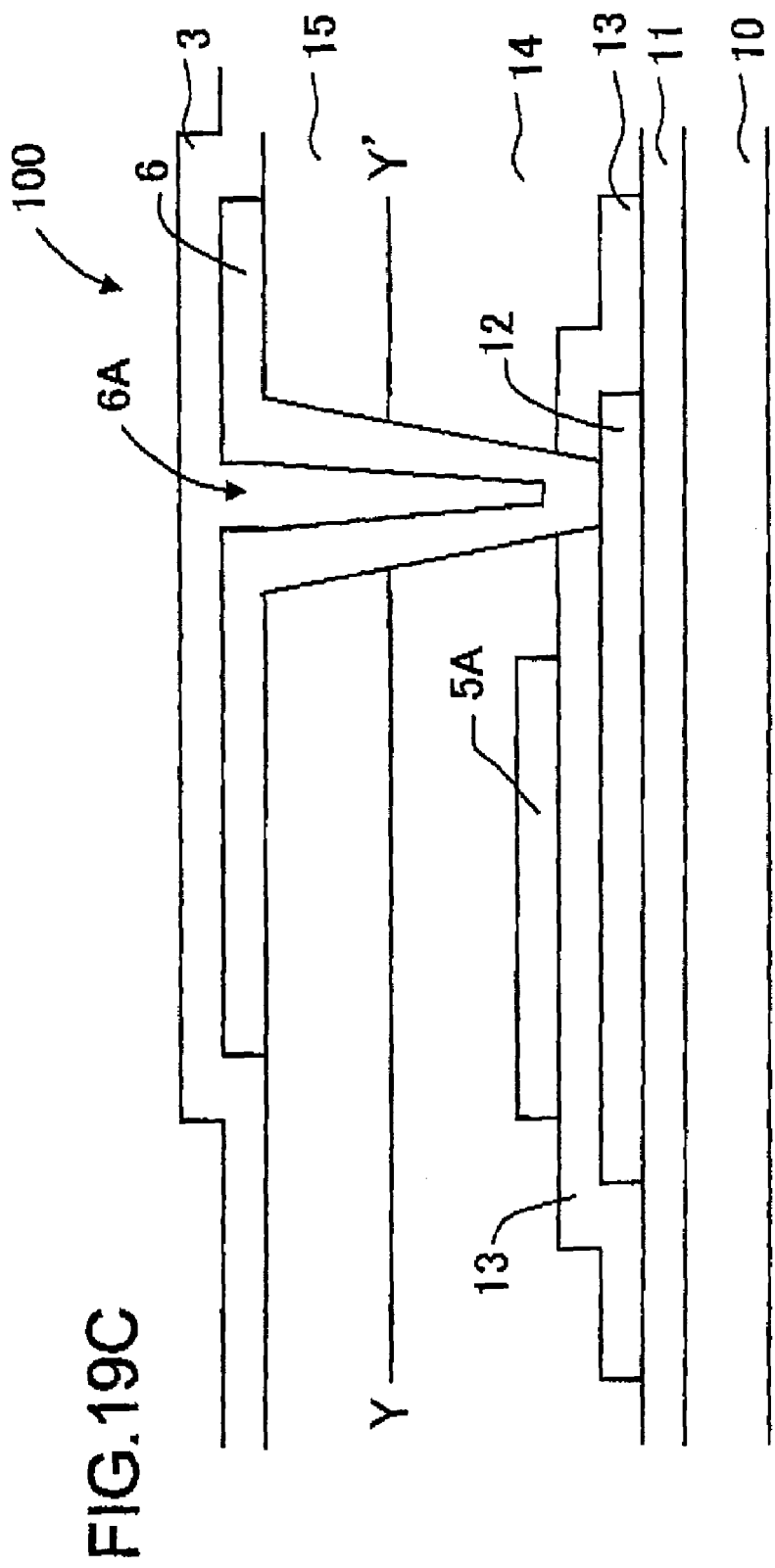
FIG. 19C is a cross-sectional view, taken along line Y-Y' of FIG. 19A.
Figure 20A:
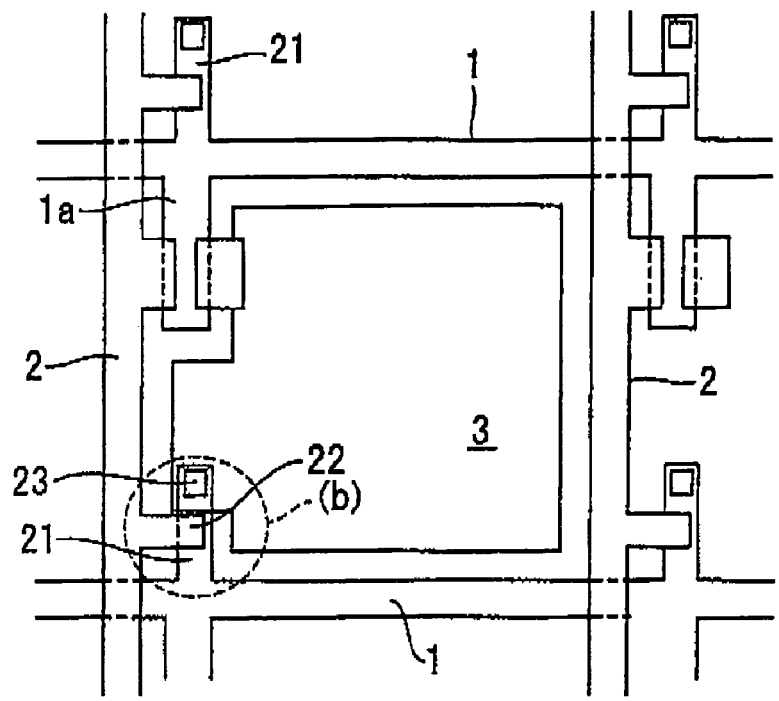
FIG. 20A is a top view showing an exemplary structure of a basic unit in an active matrix substrate, which is one of a pair of substrates facing each other and having a liquid crystal layer interposed between them, in a conventional active type liquid crystal display apparatus.
Figure 20B:
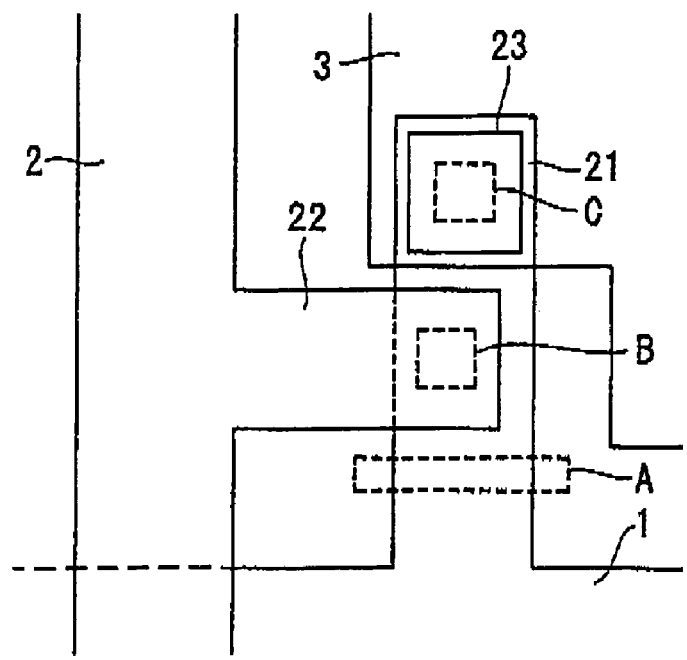
FIG. 20B is an enlarged view showing a portion enclosed by a circle of FIG. 20A.
Figure 21:
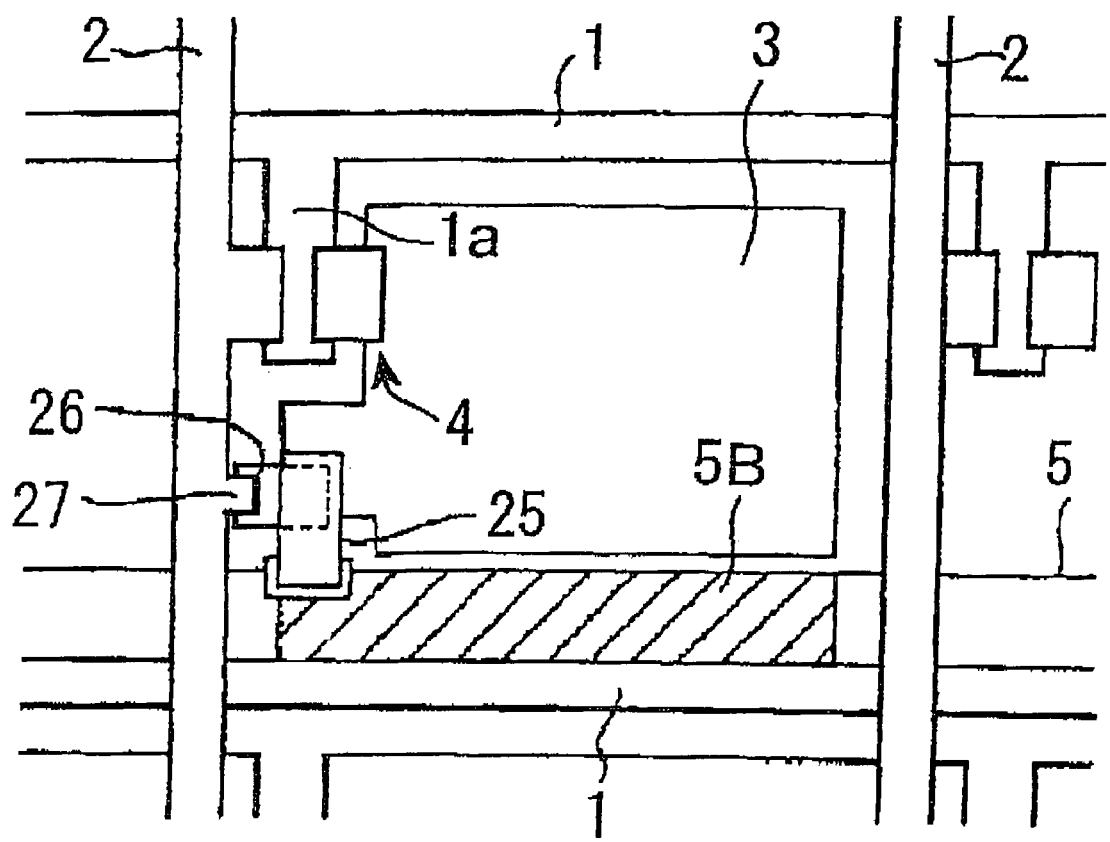
FIG. 21 is a top view showing an exemplary structure of a basic unit in an active matrix substrate, which is one of a pair of substrates facing each other and having a liquid crystal layer interposed between them, in a conventional active type liquid crystal display apparatus.

FIG. 1A is a top view showing an exemplary structure of a basic unit in an active matrix substrate, which is one of a pair of substrates facing each other and having a liquid crystal layer interposed between them, in an active type liquid crystal display apparatus according to Embodiment 1 of the present invention. FIG. 1B is a cross-sectional view, taken along line A-A' of FIG. 1A. Note that parts of FIG. 1A having substantially the same functions and effects as those of parts of the conventional apparatus of FIG. 19A are indicated by the same reference numerals and will not be explained in detail. The cross-sectional view of FIG. 13 shows the same portion as those of FIG. 19B and FIG. 19C and will not be explained.

In FIGS. 1A and 1B, the active type liquid crystal display apparatus of Embodiment 1 comprises a pair of substrates, i.e., an active matrix substrate 110 and a counter substrate, which face each other and have a liquid crystal layer (display medium) interposed between them. The active matrix substrate 110 has the following configuration on a glass substrate 10 in addition to the configuration of the conventional active matrix substrate 100 of FIGS. 19A to 19C. A switching element (TFT 4) has a first region (e.g., a source region 12c) connected to a source bus line 2. The switching element (TFT 4) has a second region (e.g., a drain region 12c), from which a portion of a semiconductor layer (extending portion 12) extends from a broad-width portion 5A of an additive-capacitor bus line 5 toward a gate bus line 1 (in a direction parallel to the source bus line 2). A first projecting portion 12A (first layer) is projected from the extending portion 12. The first projecting portion 12A (first layer) is made of the semiconductor layer which is produced by the same production step as that of the extending portion 12. Hereinafter, the first projecting portion 12A is referred to as a semiconductor layer projecting portion 12A. The semiconductor layer projecting portion 12A may be integrated with the extending portion 12 and the above-described second region. The TFT 4 may be formed by the same step and with the same material as those of a switching element contained in each of a gate bus line drive portion and a source bus line drive portion.

In addition, a second projecting portion 7 connected to the source bus line 2 via a contact hole portion 2A is provided. The second projecting portion 7 is produced in the same step as that of the gate bus line 5 and is a metal layer made of the same conductive material as that of the gate bus line 5. The second projecting portion 7 is hereinafter referred to as a gate metal projecting portion 7. The first projecting portion (first layer) and the second projecting portion (second layer) may be made of either a semiconductor (e.g. silicon) or a conductive material.

The semiconductor layer projecting portion 12A and the gate metal projecting portion 7 partially overlap each other (overlapping portion 7a (FIG. 2A)), interposing a gate insulating film 13 as shown in FIG. 1B. The gate insulating film 13 may be used as an insulating film for insulating the semiconductor layer projecting portion 12A and the gate metal projecting portion 7. Another insulating film may be used.

Figure 2A:
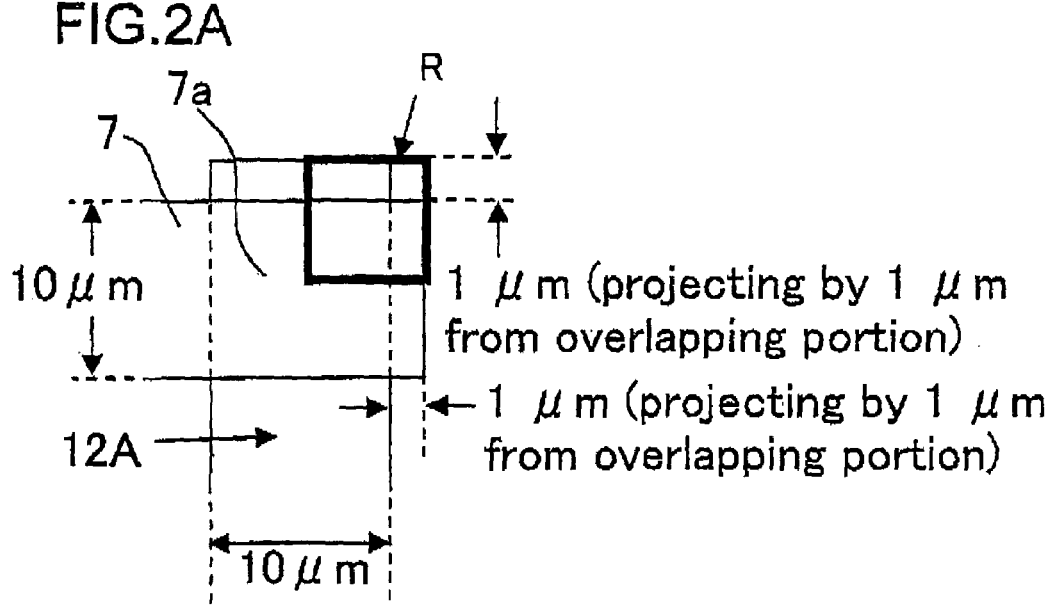
FIG. 2A is an enlarged view of a portion enclosed with a circle indicated by arrow Z in FIG. 1A.
Figure 2B:
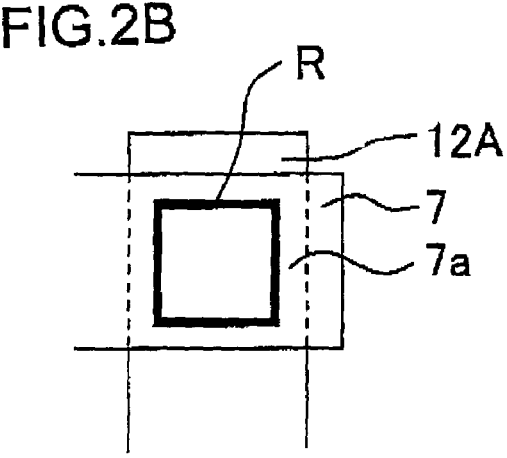
FIG. 2B shows a laser spot R of laser radiation for repairing a defect located at a middle portion.

FIGS. 2A and 2B are enlarged views of a portion enclosed within a circle indicated by arrow Z in FIG. 1A. FIG. 2A shows a laser spot R of laser radiation for repairing a defect located at a corner portion. FIG. 2B shows a laser spot R of laser radiation for repairing a defect located at a middle portion.

As shown in FIG. 1A and FIG. 2A, the semiconductor layer projecting portion 12A projects towards the top of the figure from an upper left portion of the extending portion 12 by a predetermined length with a with of 10 μm parallel to the source bus line 2. The gate metal projecting portion 7 projects from the source bus line 2 with a width of 10 μm in the top view at a substantially middle position between the gate bus line 1 and the additive-capacitor bus line 5. The gate metal projecting portion 7 is extended toward the right-hand side of the semiconductor layer projecting portion 12A from below the source bus line 2 (e.g., orthogonally to the source bus line and 2 in a lower layer in the multilayer structure). In addition, the semiconductor layer projecting portion 12A and the gate metal projecting portion 7 each project from the overlapping portion 7a by about 1 μm. Note that the irradiation position of the laser spot R will be described below.

Now, a method for producing the above-described active matrix substrate 110 and a method for producing an active type liquid crystal display apparatus using the same will be described.

Referring to FIGS. 1A and 1B, a SiON film (base coat film 11) having a thickness of 100 nm is formed on the glass substrate 10 using a plasma CVD method.

Next, a silicon (Si) layer having a thickness of 50 nm is formed as a semiconductor layer using a plasma CVD method, followed by crystallization by heat treatment and laser annealing. The Si layer is patterned into a predetermined shape such that the drain region 12c of the TFT 4, the extending portion 12, and the semiconductor layer projecting portion 12A projecting from the extending portion 12 are integrated together. The extending portion 12 is extended to under the broad-width portion 5A of the additive-capacitor bus line 5.

In this case, by doping P (phosphor) into an N channel region 12a (FIG. 19B) of the silicon (Si) layer, an n−region 12b (LDD region) and an n+ region 12c (source region/drain region) are formed. The impurity element added to the semiconductor layer is activated by heat treatment. Note that boron is doped into a P channel region.

In addition, a SiON film having a thickness of 115 nm is formed as a gate insulating film 13 on the semiconductor layer containing the base coat film 11 and the semiconductor layer projecting portion 12A using a plasma CVD method.

A tantalum nitride film having a film thickness of 50 nm and a tungsten film having a film thickness of 370 nm are successively formed as a gate metal layer (gate metal) into a predetermined shape using a sputtering method on the gate insulating film 13. Thus, the additive-capacitor bus line 5, the broad-width portion 5A and the gate metal projecting portion 7 as well as the gate bus line l and a gate electrode 1a (control electrode) are formed in the same step and with the same material. In this case, an overlapping portion 7a of the semiconductor layer projecting portion 12A and the gate metal projecting portion 7 are insulated from each other by the gate insulating film 13 interposed therebetween.

Further, a silicon nitride film having a thickness of 300 nm is formed as an interlayer film 14 using a CVD method. The silicon nitride film is subjected to heat treatment to hydrogenate the Si layer. In this step, a dangling bond of the Si layer is terminated by hydrogen contained in the interlayer film 14 made of silicon nitride film.

Further, a resin layer 15 made of an organic insulating material, which has a film thickness of, for example, 1.6 μm, is formed.

Further, a contact hole portion 2A is formed in the interlayer film 14 and the resin layer 15 to connect the gate metal projecting portion 7 and the source bus line 2. Further, a contact hole portion 6A (FIG. 19C) is formed in the gate insulating film 13, the interlayer film 14 and the resin layer 15 to connect the extending portion 12 in the semiconductor layer and the pixel electrode 3 (transparent electrode).

Thereafter, Ti, Al and Ti layers (source metals) having a film thickness of 100 nm, 500 nm and 100 nm, respectively, are formed and patterned into a predetermined shape using a sputtering method. As a result, a source metal 6 and the source bus line 2 for connecting the pixel electrode 3 and the extending portion 12 are formed. As shown in FIG. 1B, the source bus line 2 is connected with the gate metal projecting portion 7 via the contact hole portion 2A.

Further, an ITO film having a thickness of 100 nm is formed as a transparent electrode using a sputtering method. The ITO film is patterned into a matrix shape having columns and rows, resulting in each pixel electrode 3.

Thereafter, an alignment film (PI; not shown) is printed on the source bus line 2, the pixel electrode 3, and the resin layer 15, and the alignment film is rubbed along a predetermined direction, resulting in the complete active matrix substrate 110 of the present invention.

Ball spacers (not shown) are distributed on a side facing the alignment film of the active matrix substrate 110. A counter substrate (not shown) is mounted on the ball spacers, so that the active matrix substrate 110 and the counter substrate are attached to each other, evenly spaced apart from each other with a predetermined gap. A gap between the two substrates is filled with a liquid crystal and the opening is sealed. A counter electrode (transparent electrode) is formed on the counter substrate. An alignment film (PI; not shown) is also previously printed on the counter electrode and is rubbed in a manner similar to that which is described above.

Thus, an active type liquid crystal display apparatus comprising the active matrix substrate 110 of Embodiment 1 of the present invention is completed.

Next, a repair method will be described, which is performed when a pixel defect is detected in the active type liquid crystal display apparatus of Embodiment 1 of the present invention. By applying an appropriate drive signal to a pixel electrode and a counter electrode via a gate bus line and a source bus line, a predetermined display pattern is displayed on a display screen. It is determined by a determining instrument (or a human) whether or not light output from the display apparatus via the pixel electrode is normal.

When an abnormality occurs in the TFT 4 or a current leakage occurs between the source bus line 2 and the pixel electrode 3, a point defect occurs which causes a problem with display. When a point defect is detected (i.e., it is determined that light output from a display apparatus via a pixel electrode is not normal), the pixel defect (point defect) can be repaired in Embodiment 1 as follows.

The active matrix substrate 110 having the TFT 4 (TFT substrate) is attached to a counter substrate (not shown). A gap between the two substrates is filled with a liquid crystal. In this state, by applying a predetermined electrical signal for inspection to the gate bus line 1 and the source bus line 2, a point defect may be detected among a plurality of pixel portions.

For a pixel portion in which a point defect has been detected, the gate insulating film 13 between the gate metal projecting portion 7 and the semiconductor layer projecting portion 12A is destroyed by performing laser irradiation having a relatively low power once, thereby short-circuiting the gate metal projecting is portion 7 and the semiconductor layer projecting portion 12A, which intersect each other orthogonally. In this case, the active matrix substrate 110 (TFT substrate) and the counter substrate (not shown) are already attached together, and therefore, laser radiation is applied from outside of the substrate 110 (an outer surface of a transparent glass 10, a bottom side of the TFT 4) toward the inside thereof. Thus, by short-circuiting the semiconductor layer projecting portion 12A and the gate metal projecting portion 7, a point defect is repaired in the display apparatus of the present invention.

The above-described laser light may be, for example, YAG laser light. The laser spot R may be generally in the shape of a circle having a diameter of several micrometers or a square having a side of several micrometers. In Embodiment 1, for example, a square of 5 μm×5 μm is used as the laser spot R.

As in Embodiment 1, the semiconductor layer projecting portion 12A and the gate metal projecting portion 7 each project from the overlapping portion 7a by about 1 μm. By irradiating a corner portion including the projecting portion with laser, alignment accuracy is improved during laser irradiation. Therefore, laser irradiation can be easily performed with less power to short-circuit the semiconductor layer projecting portion 12A and the gate metal projecting portion 7.

Further, as shown in FIG. 2A (laser spot R), by irradiating a corner portion including tip portions of the semiconductor layer (Si layer) projecting portion 12A and the gate metal projecting portion 7 (also including the overlapping portion 7a) with laser light, it is possible to short-circuit more easily (with less power) the semiconductor layer projecting portion 12A and the gate metal projecting portion 7. In this case, the energy of the laser applied to portions projecting from the overlapping portion 7a of the semiconductor layer projecting portion 12A and the gate metal projecting portion 7 is greater than the energy of the laser applied to the overlapping portion 7a. At least a portion of the energy of laser light is applied to the gate insulating film 13.

In contrast, as shown in FIG. 2B (laser spot R), when laser radiation is applied to a middle portion of the overlapping portion 7a of the semiconductor layer projecting portion 12A and the gate metal projecting portion 7, most of the laser power is absorbed by (concentrated on) only the semiconductor layer projecting portion 12A, so that it is difficult to short-circuit the semiconductor layer projecting portion 12A and the gate metal projecting portion 7. When laser irradiation is applied to the middle portion of the overlapping portion 7a of the semiconductor layer projecting portion 12A and the gate metal projecting portion 7 as shown in FIG. 2B (laser spot R) under the same conditions (laser power) as when laser irradiation is applied to the corner portion of the overlapping portion 7a of the semiconductor layer projecting portion 12A and the gate metal projecting portion 7 as shown in FIG. 2A (laser spot R), the semiconductor layer projecting portion 12A and the gate metal projecting portion 7 cannot be certainly short-circuited.

Therefore, it is possible to short-circuit the semiconductor layer projecting portion 12A and the gate metal projecting portion 7 with less power when laser radiation is applied to the corner portion of the overlapping portion 7a as compared to when laser radiation is applied to the middle portion of the overlapping portion 7a. When the power of laser radiation is increased for the middle portion of the overlapping portion 7a as compared to the corner portion, it is possible to short-circuit the semiconductor layer projecting portion 12A and the gate metal projecting portion 7 by laser irradiation of the middle portion of the overlapping portion 7a of the semiconductor layer projecting portion 12A and the gate metal projecting portion 7 as shown in FIG. 2B. However, if the laser power is excessively increased, an adverse influence of laser irradiation on portions other than the irradiated region is increased. In this case, elements other than the semiconductor layer projecting portion 12A and the gate metal projecting portion 7 are likely, to be adversely influenced. This problem will be described below with reference to FIGS. 3A and 3B.

Figure 3A:
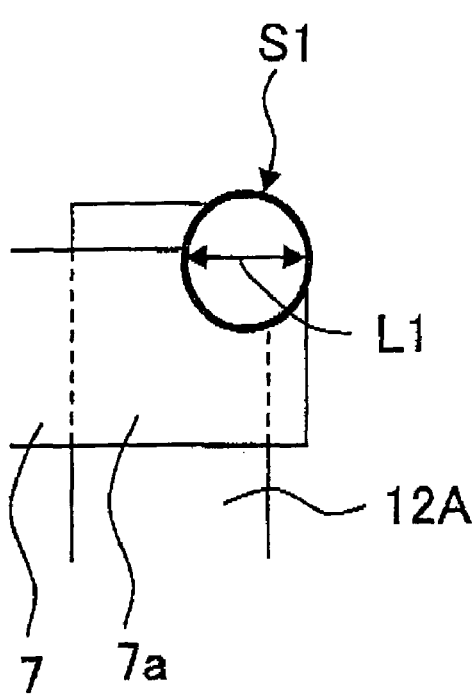
FIGS. 3A and 3B are diagrams for explaining an influence of laser irradiation for repairing a defect.
Figure 3B:
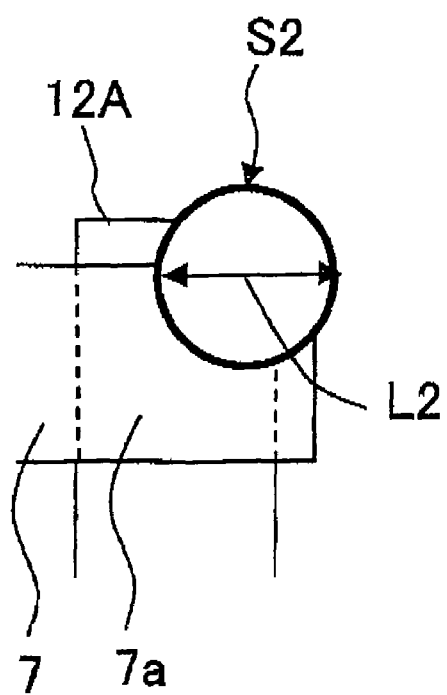

FIG. 3A shows a portion S1 influenced by laser irradiation. FIG. 3B shows a portion S2 influenced by laser irradiation when only laser power is increased while the size of a laser spot R on the portion S2 is the same as the size of a laser spot R on the influenced portion S1 of FIG. 3A. In an influenced portion indicated by L1 or L2 in FIG. 3A or 3B, scattering of S1 or gate metal occurs. If such a foreign element enters the region, laser irradiation is likely to cause a defect. Therefore, it is preferable that laser irradiation is performed with as small a laser power as possible. It is also preferable that laser radiation is applied to a corner portion (the laser spot R of FIG. 2A) at a tip of the overlapping portion 7a of the semiconductor layer projecting portion 12A and the gate metal projecting portion 7. Note that if laser radiation is applied to a corner portion other than the above-described corner portion at the tip of the overlapping portion 7a (e.g., a portion nearer to the source bus line 2 than the laser spot R), the influence of laser irradiation is adversely increased as the irradiation portion is closer to the source bus line 2.

Thus, by short-circuiting the semiconductor layer projecting portion 12A and the gate metal projecting portion 7 as described above, a source, signal (image signal) is input from the source bus line 2 directly to the pixel electrode 3 irrespective of a gate signal from the gate bus line 1. As a result, the defective pixel portion is displayed as neither a complete luminous point nor a complete black point. Therefore, a defective pixel portion, which has been subjected to the above-described repair treatment (melt treatment), is not easily recognized visually as a defeat, though it does not work normally. In other words, such a defective pixel is in an intermediate display state. Therefore, such a defective pixel can be said to be a normal pixel in terms of screen display.

As described above, according to Embodiment 1, it is possible to obtain the active matrix substrate 110 having the following feature. Even if a pixel defect occurs, a defective pixel can be easily repaired by performing laser irradiation once and with less power to short-circuit the source bus line 2 and the pixel electrode 3, compared to conventional techniques requiring performing laser irradiation three times and with higher power. Therefore, the production yield can be improved and the production cost can be reduced.

Embodiment 2

In the above-described Embodiment 1, the TFT 4 has a top gate structure, in which a gate metal layer (gate electrode 1a) is disposed on the channel layer 12a via the gate insulating film 13. In Embodiment 2, as shown in FIGS. 4A and 4B and FIGS. 5A and 5B, the TFT 4 has a bottom gate structure, in which a gate metal layer (gate electrode 1a) is disposed below a channel layer 12a via a gate insulating film 13.

Figure 4A:
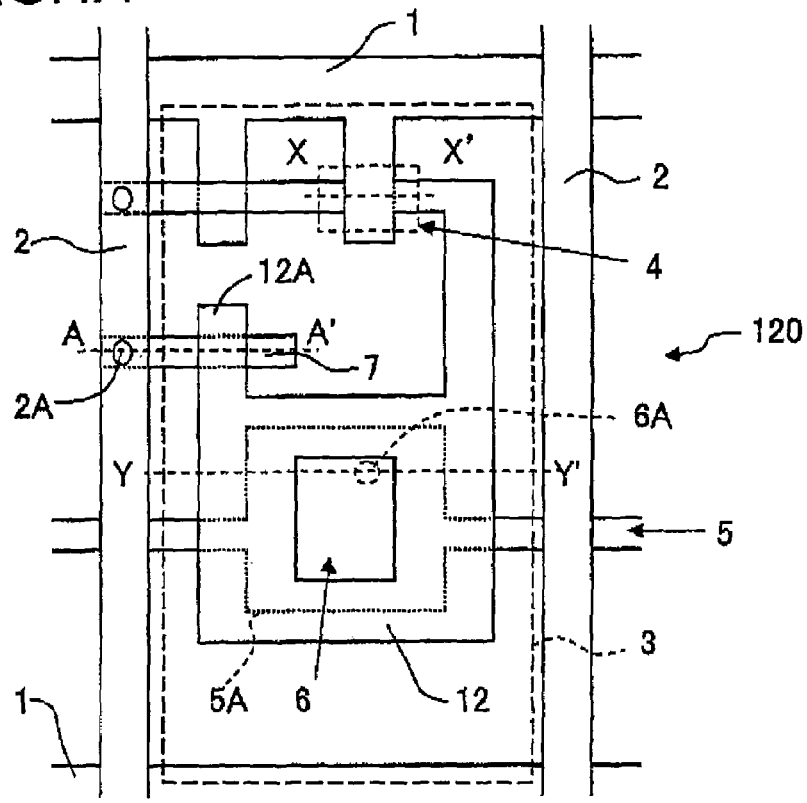
FIG. 4A is a top view showing an exemplary structure of a basic unit in an active matrix substrate, which is one of a pair of substrates facing each other and having a liquid crystal layer interposed between them, in an active type liquid crystal display apparatus according to Embodiment 2 of the present invention.
Figure 4B:
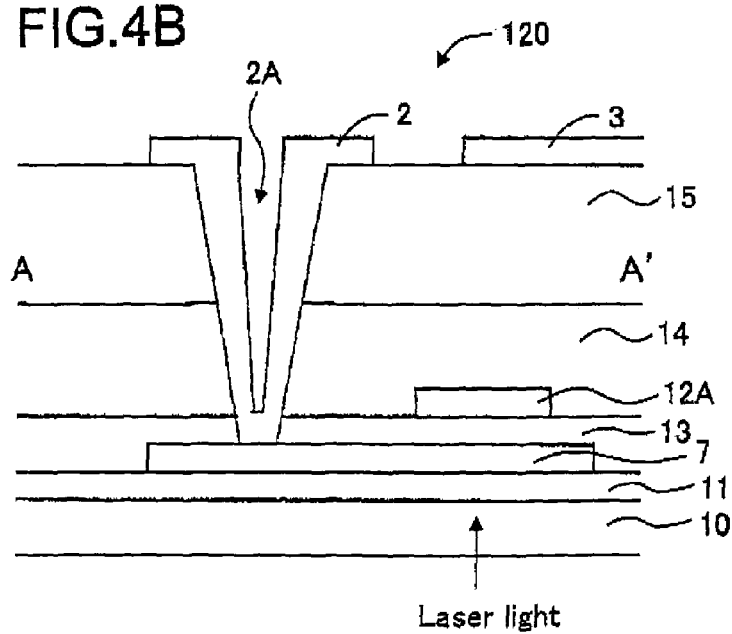
FIG. 4B is a cross-sectional view, taken along line A-A' of FIG. 4A.

FIG. 4A is a top view showing an exemplary structure of a basic unit in an active matrix substrate, which is one of a pair of substrates facing each other and having a liquid crystal layer interposed between them, in an active type liquid crystal display apparatus according to Embodiment 2 of the present invention. FIG. 4B is a cross-sectional view, taken along line A-A' of FIG. 4A. FIG. 5A is a cross-sectional view, taken along line X-X' in FIG. 4A. FIG. 5B is a cross-sectional view, taken along line Y-Y' of FIG. 4A.

In FIGS. 4A and 4B and FIGS. 5A and 5B, an active matrix substrate 120 contained in an active type liquid crystal display apparatus has a TFT 4 which has a bottom gate structure. In the active matrix substrate 120, a semiconductor layer (including an extending portion 12) having a drain region 12c and a semiconductor layer projecting portion 12A in the TFT 4 is provided via a gate insulating film 13 on a metal layer gate bus line 1 including an additive-capacitor bus line 5 and a gate metal projecting portion 7. The other parts of the active matrix substrate 120 are the same as those of the active matrix substrate 110 of FIGS. 1A and 1B.

Also in the active type liquid crystal display apparatus comprising the active matrix substrate 120, the gate metal projecting portion 7 and the semiconductor layer projecting portion 12A may be short-circuited by performing laser irradiation once on a corner portion of an overlapping portion 7a of the gate metal projecting portion 7 and the semiconductor layer projecting portion 12A to destroy the gate insulating film 13, thereby making it possible to readily repair a defective pixel so that the defective pixel is not easily recognized.

Embodiment 3

In the above-described Embodiments 1 and 2, in order to repair a defective pixel, the overlapping portion 7a of the gate metal projecting portion 7 made of a conductive material (metal) layer and the semiconductor layer projecting portion 12A made of a semiconductor layer is short-circuited. In Embodiment 3, in order to repair a defective pixel, an overlapping portion 7b of a gate metal projecting portion 7 made of a conductive material (metal) layer and a conductive material layer projecting portion 12B connected to an extending portion 12 of a semiconductor (Si) layer is short-circuited as described below.

Figure 6A:
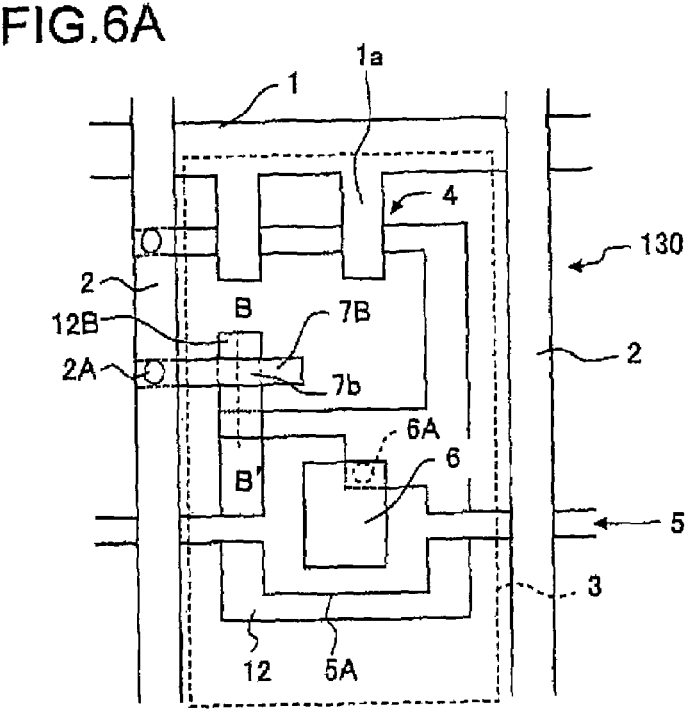
FIG. 6A is a top view showing an exemplary structure of a basic unit in an active matrix substrate, which is one of a pair of substrates facing each other and having a liquid crystal layer interposed between them, in an active type liquid crystal display apparatus according to Embodiment 3 of the present invention.
Figure 6B:
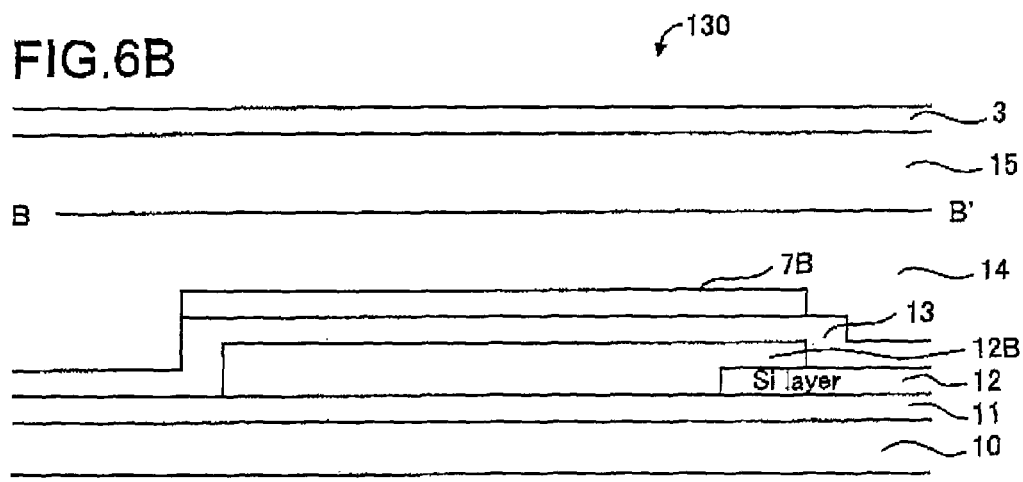
FIG. 6B is a cross-sectional view, taken along line B-B' of FIG. 6A.

FIG. 6A is a top view showing an exemplary structure of a basic unit in an active matrix substrate, which is one of a pair of substrates facing each other and having a liquid crystal layer interposed between them, in an active type liquid crystal display apparatus according to Embodiment 3 of the present invention. FIG. 6B is a cross-sectional view, taken along line B-B' of FIG. 6A.

In the above-described Embodiment 1, the same semiconductor layer as that which the extending portion 12 comprises is used to form a semiconductor layer projecting portion 12A as the first projecting portion connected to the drain region 12c of the TFT 4 (FIG. 19B). Instead, in Embodiment 3, a semiconductor other than Si, a metal material (e.g., Ta, W, Ti, Mo, Al, Cu, etc.), an alloy material or a compound material including these metal elements as a major component, or the like, may be used to form a conductive material layer projecting portion 12B as a first projecting portion.

In the above-described Embodiment 1, the gate metal projecting portion 7 made of the same metal layer as that of the gate bus line 1 is formed as the second projecting portion connected via the contact hole portion 2A to the source bus line 2. Instead, in Embodiment 3, a semiconductor other than Si, a metal material (e.g., Ta, W, Ti, Mo, Al, Cu, etc.), an alloy material or a compound material including these metal elements as major components, or the like, may be used to form a second projecting portion 7B.

The arrangements and sizes of the first projecting portion 12B and the second projecting portion 7B are not limited to those shown in FIGS. 1A, 2A and 4A, as long as the first projecting portion 12B is connected to an extending portion 12, which extends from a semiconductor layer having a drain region of a TFT 4 to below abroad-width portion 5A, and the second projecting portion 7B is connected to a source bus line 2 via a contact hole portion 2A, and the first projecting portion 12B and the second projecting portion 7B overlap each other, having a gate insulating film 13 interposed therebetween. For example, the first projecting portion 12B may project downward from the semiconductor layer extending portion 12. Alternatively, the first projecting portion 12B may project from a middle portion or a right-hand end portion of the semiconductor layer extending portion 12, but not from a left-hand end portion thereof as shown FIG. 1A. In addition, a width of the projecting portion can be longer than that shown in FIG. 1A and a portion projecting from the overlapping portion 7b can be longer than that shown in FIG. 1A. Similarly, the second projecting portion 7B may be provided closer to a gate bus line 1 or an additive-capacitor bus line 5, but not on a middle position between the gate bus line 1 and the additive-capacitor bus line 5. A width of the projecting portion can be longer than that shown in FIG. 1A. The overlapping portion 7b and a portion projecting from the overlapping portion 7b can be longer than that shown in FIG. 1A.

Embodiment 4

In the above-described Embodiments 1 to 3, the first projecting portion and the second projecting portion are short-circuited by destroying the gate insulating film 13 therebetween. In Embodiment 4, a conductive material projecting portion (first layer) 12D projecting a drain electrode D (including an extending portion 12 extending the drain electrode D) of a TFT 4 and a conductive material projecting portion 7D, are short-circuited by destroying an interlayer film 14 (insulator).

FIG. 7A is a circuit diagram schematically showing an exemplary configuration of a basic unit on an active matrix substrate in an active type liquid crystal display apparatus according to Embodiment 4 of the present invention. FIG. 7B is a cross-sectional view showing a switching element portion and a source bus line short-circuit portion of FIG. 7A. Note that parts of FIGS. 7A and 7B having substantially the same functions and effects as those of FIGS. 1A and 1B are indicated by the same reference numerals.

In FIG. 7A, an active matrix substrate 140 has the following configuration. A plurality of gate bus lines 1 parallel to one another intersect (e.g., orthogonally) with a plurality of source bus lines 2 parallel to one another so that the lines are arranged in a grid. An additive-capacitor bus line 5 is disposed parallel to each gate bus line 1. A pixel electrode 3 is provided in each region surrounded by the bus lines 1 and 2 (or at each intersection of the bus lines 1 and 2). The pixel electrode 3 and the additive-capacitor electrode (the semiconductor layer extending portion 12 in Embodiment 1) are connected to the drain electrode D (the drain region 12c in Embodiment 1) of the TFT 4 (dual gate structure) as a switching element. The gate bus line 1 is connected to a gate electrode G (the gate region 1a in Embodiment 1), while the source bus line 2 is connected to a source electrode S (the source region 12c in Embodiment 1).

In addition, the conductive material projecting portion 12D (herein made of the same material as that of the source bus line 2) connected to the drain electrode D of the TFT 4 is extended close to the source bus line 2. A conductive material projecting portion 7D is provided, which overlaps the conductive material projecting portion 12D (first projecting portion) via an insulating film (interlayer film 14). The conductive material projecting portion 7D (second projecting portion) is made of a conductive material (herein, the same material as that of the gate bus line 1) connected to the source bus line 2 via a contact hole portion 2A. Tip portions of the conductive material projecting portion 12D and the conductive material projecting portion 7D are projected by respective predetermined amounts from an overlapping portion therebetween, as in Embodiments 1 to 3. The overlapping portion is short-circuited when a defective pixel is repaired. Specifically, in order to repair a defective pixel, a corner portion including the projecting portion and the overlapping portion is irradiated with laser light having a predetermined level of power to short-circuit the conductive material projecting portion 7D and the conductive material projecting portion 12D as indicated with a dashed line in FIG. 7B.

Figure 8:
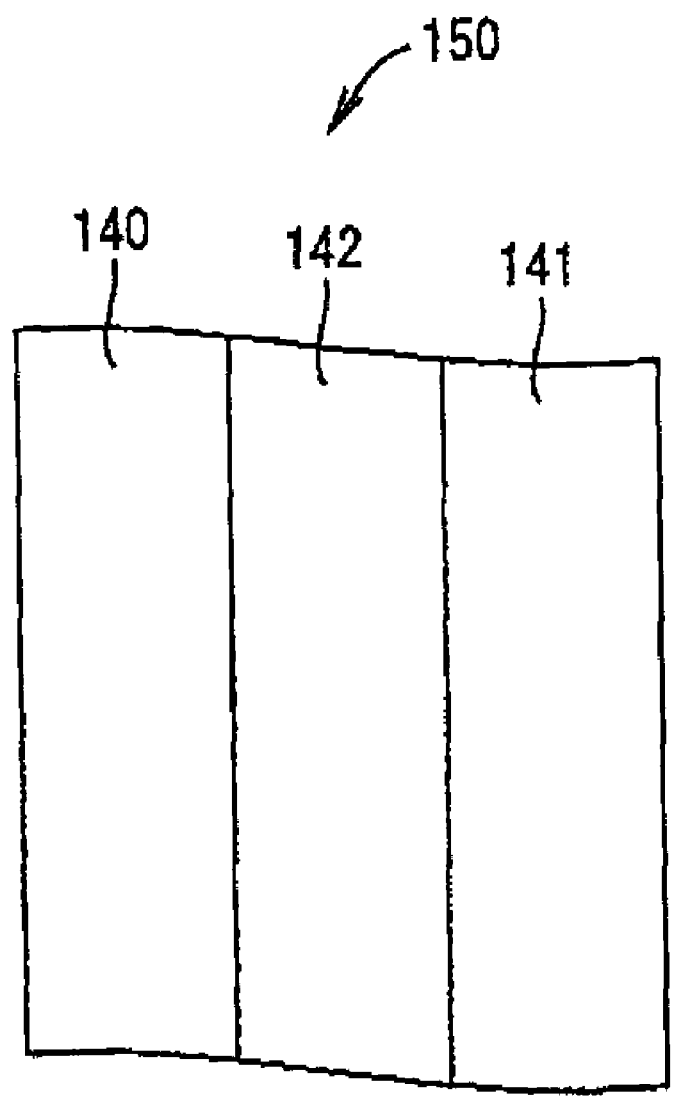
FIG. 8 is a partial cross-sectional view schematic alley showing an active type liquid crystal display apparatus according to an embodiment of the present invention.

A method for producing the above-described active matrix substrate 140 and a method for producing an active type liquid crystal display apparatus 150 using the same will be described with reference to FIG. 8.

Referring to FIG. 7B, SiON (base coat 11) having a thickness of 100 nm is formed on a glass substrate 10 (insulator substrate) using a plasma CVD method.

Next, a semiconductor layer (e.g., silicon layer) having a thickness of 50 nm is formed using a plasma CVD method. The semiconductor layer is subjected to crystallization by laser annealing (heat treatment). Thereafter, the semiconductor layer is patterned into a predetermined shape.

Further, SiON (gate insulating film 13) having a thickness of 115 nm is formed on the semiconductor layer using a plasma CVD method.

Further, a tantalum nitride film having a film thickness of 50 nm and a tungsten film having a film thickness of 370 nm are successively formed as conductive materials on the gate insulating film 13 using a sputtering method and are patterned into a predetermined shape, i.e., the conductive material projecting portion 7D and the gate region 1a (7D and 1a are made of the same material). Instead of tantalum nitride and tungsten, an element selected from Ta, W, Ti, Mo, Al, and Cu, an alloy material or a compound material including these metal elements may be used to form the conductive material projecting portion 7D and the gate region 1a.

By doping P (phosphor) into the silicon semiconductor layer via the gate insulating film 13 from the gate region 1a, the silicon semiconductor layer on opposite sides of the gate region 1a is changed into an n− region 12b and an n+ region 12c (source or drain region 12c). As a result, a TFT 4 is formed. The above-described procedure is used for the formation of an N channel. Boron (B) is doped into the semiconductor layer in order to form a P channel.

Further, heat treatment is performed to activate the impurity element added into the semiconductor layer.

Further, an interlayer film 14 having a film thickness of 950 nm, which has a double-layer structure including a silicon nitride film and an oxide film, is formed as an insulating film using a CVD method.

Next, a contact hole portion, which reaches the drain region 12c of the TFT 4, is formed in the gate insulating film 13 and the interlayer film 14. Also, a contact hole portion 2A, which reaches the conductive material projecting portion 7D, is formed in the interlayer film 14.

Thereafter, Ti, Al and Ti layers (conductive material: the conductive material projecting portion 12D and the source bus line 2 are made of the same material) having a film thickness of 100 nm, 500 nm and 100 nm, respectively, are successively formed and patterned into a predetermined shape, resulting in the conductive material projecting portion 12D and the source bus line 2.

The conductive material projecting portion 12D and the conductive material projecting portion 7D are insulated from each other by the interlayer film 14. For example, the conductive material projecting portion 12D having a width of 5 μm and the conductive material projecting portion 7D having a width of 7 μm intersect each other (e.g., orthogonally), having the interlayer film 14 interposed between them. The resultant overlapping portion is used for short-circuiting.

The thus-constructed multilayer structure is subjected to heat treatment to hydrogenate the above-described semiconductor layer. By the hydrogenating step, a dangling bond of the semiconductor layer is terminated by hydrogen contained in the interlayer film 14 (interlayer insulating film) made of silicon nitride film or the like.

Further, a resin layer 15 made of an organic insulating material is formed over the interlayer insulating film 14, the conductive material projecting portion 12D, and the source bus line 2. In this case, the resin layer 15 has a film thickness of 1.6 μm.

Further, a contact hole portion is formed, which reaches the conductive material projecting portion 12D. An ITO film (pixel electrode 3) having a film thickness of 100 nm is formed using a sputtering method and is patterned into a predetermined shape (matrix), resulting in a plurality of pixel electrodes 3.

Thereafter, an alignment film (PI; not shown) is printed on the pixel electrode 3 and the resin layer 15, and the alignment film is rubbed along a predetermined direction, resulting in a complete active matrix substrate 140 of the present invention.

Ball spacers (not shown) are distributed on a side facing the alignment film of the active matrix substrate 140. As shown in FIG. 8, a counter substrate 141 is mounted on the ball spacers, so that the active matrix substrate 140 and the counter substrate are attached to each other, evenly spaced apart from each other with a predetermined gap. A liquid crystal layer 142 is interposed between the two substrates. A counter electrode (transparent electrode) is formed on the counter substrate. An alignment film (PI; not shown) is also previously printed on the counter electrode and is rubbed in a manner similar to that which is described above.

Thus, an active type liquid crystal display apparatus 150 comprising the active matrix substrate 140 of Embodiment 4 of the present invention is completed.

Next, a repair method will be described, which is performed when a pixel defect is detected in the active type liquid crystal display apparatus 150 of Embodiment 4 of the present invention.

When an abnormality occurs in the TFT 4 or a current leakage occurs between the source bus line 2 and the pixel electrode 3, laser radiation is applied to a corner portion including an overlapping portion of the conductive material projecting portion 12D and the conductive material projecting portion 7D is short-circuited. For example, laser irradiation is performed as in Embodiments 1 to 3, i.e., YAG laser light is used which creates a laser spot R in the shape of a square of 5 μm×5 μm.

Note that a laser power, a laser output pattern, and the like vary depending on the thickness of the insulating film as well as the film structure. In order to repair a defective pixel, laser irradiation is performed from a glass side (a bottom side of the TFT 4) of the active matrix substrate 140, since the active matrix substrate 140 having the TFT 4 is already attached to the counter substrate 141.

Thus, when the source bus line 2 and the pixel electrode 3 are short-circuited, a source signal is input directly from the source bus line 2 to the pixel electrode 3 irrespective of a gate signal (scanning signal) from the gate bus line 1. As a result, a repaired pixel portion is displayed as neither a complete luminous point nor a complete black point. For example, when black display is performed on an entire screen, a black display potential is applied to the source bus line 2 and a black display voltage is applied to a pixel portion. When white display is performed on an entire screen, pixel portions are displayed white. Although a pixel portion (pixel electrode 3) repaired as described above does not work normally, the repaired pixel is not easily recognized in human vision as a display defect.

Embodiment 5

Figure 9B:
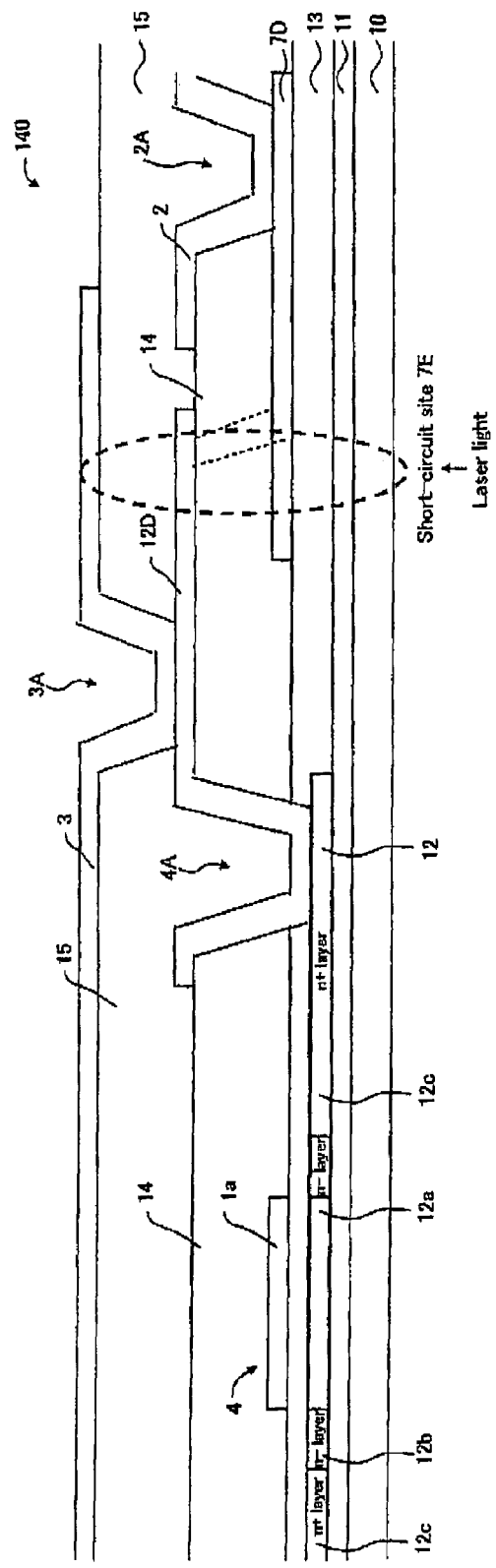
FIG. 9B is a cross-sectional view of a switching element portion and a source bus line short-circuiting site of FIG. 9A.

FIG. 9A is a circuit diagram showing an exemplary structure of a basic unit in an active matrix substrate in an active type liquid crystal display apparatus according to Embodiment 5 of the present invention. FIG. 9B is a cross-sectional view showing a switching element portion and a source bus line short-circuiting site of FIG. 9A. Embodiment 5 ls a variation of Embodiment 4. Note that parts of FIGS. 9A and 9B having substantially the same functions and effects as those of parts of FIGS. 7A and 7B are indicated by the same reference numerals.

Figure 10B:
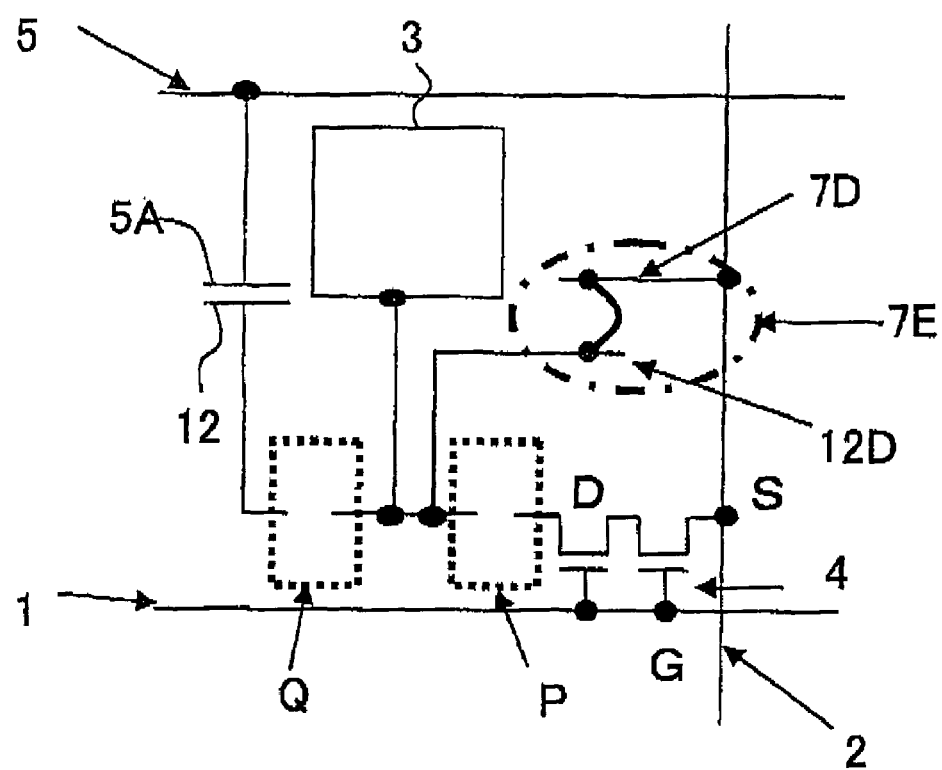
FIG. 10B is a circuit diagram of the active matrix substrate after laser irradiation of FIG. 10A.

In Embodiment 5, the active matrix substrate is provided with the following sites for laser irradiation: a short-circuit site 7E including an overlapping portion between a conductive material projecting portion 12D and a conductive material projecting portion 7D; a drain disconnect site P at which a drain region is electrically cut off from a pixel electrode 3; and an additive-capacitor disconnect site Q at which an additive-capacitor portion is electrically disconnected from the pixel electrode 3. For a pixel portion in which a point defect caused by malfunction of an additive-capacitor portion and a TFT 4 is detected, laser radiation is applied to the overlapping portion of the conductive material projecting portion 12D and the conductive material projecting portion 7D, and laser radiation is applied to the drain electrode disconnect site P and the additive-capacitor disconnect site Q. These laser irradiated portions (enclosed with dashed lines) are shown in FIGS. 10A and 10B. Note that cross-section sites of FIG. 10A are indicated by numerical figures in squares in FIG. 11B.

A two-dimensional structure of the active matrix substrate 140 of FIG. 9A will be described in more detail with reference to FIGS. 11A and 11B.

Figure 11B:
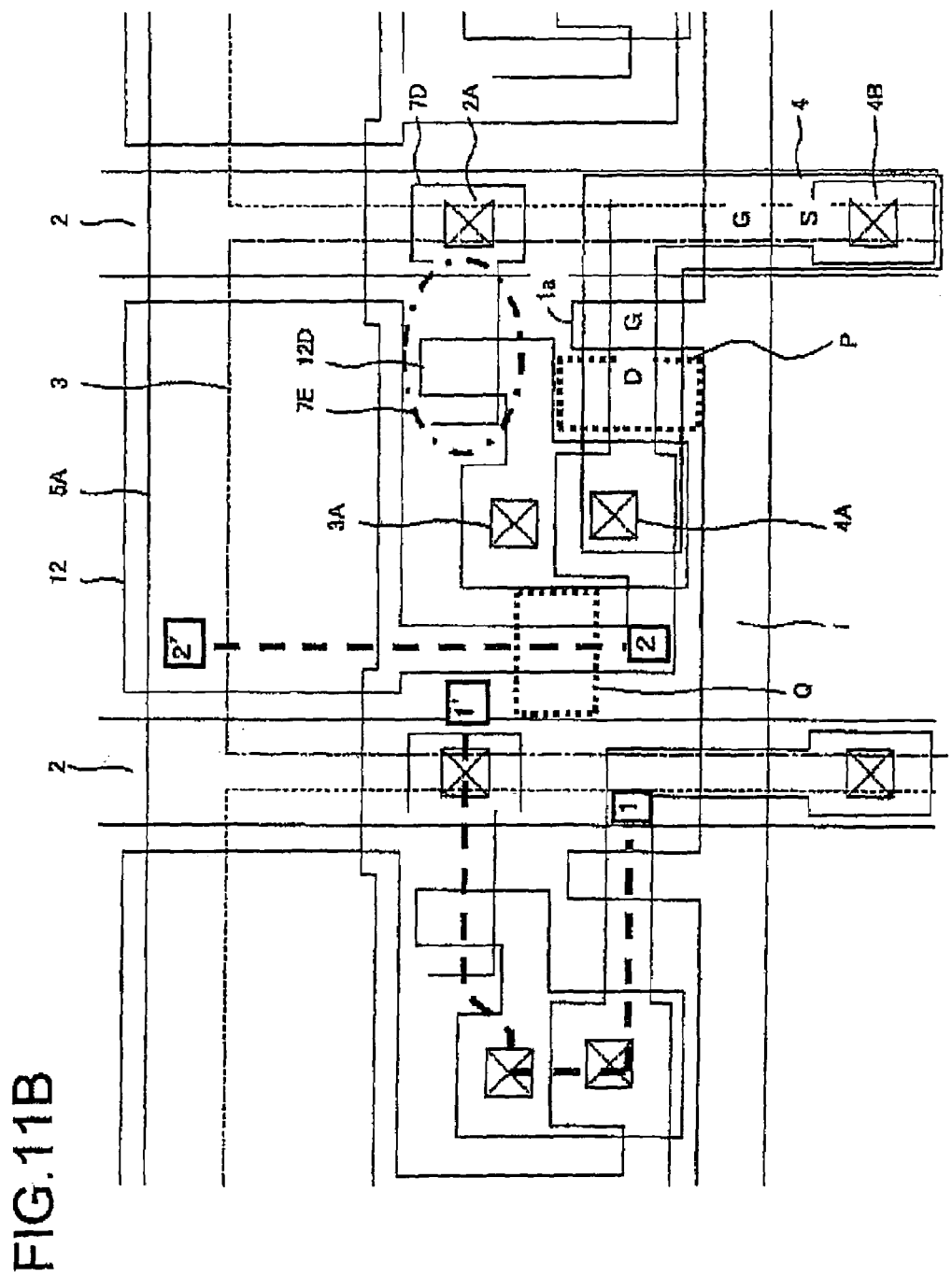
FIG. 11B is an enlarged view of a portion of FIG. 11A.

FIG. 11A is a top view showing a configuration of a portion of the active matrix substrate 140 of FIG. 9A. FIG. 11B is an enlarged view of a portion of FIG. 11A.

As described above, in FIGS. 11A and 11B, a gate bus line 1 and a source bus line 2 are disposed in a grid and an additive-capacitor bus line 5 is disposed parallel to the gate bus line 1, on one of a pair of insulator substrates, which is the active matrix substrate 140. A pixel electrode 3 is provided in each region surrounded by the bus lines 1 and 2. The pixel electrode 3 and an extending portion 12 are connected to the TFT 4 and the source bus line 2 respectively. A broad-width portion 5A and the extending portion 12 each serve as an additive-capacitor electrode facing each other.

In the TFT 4, one of the dual gates is provided under the source bus line 2, while the other gate is provided below the pixel electrode 3. Thus, the TFT 4 is in the shape of an L, viewed from the top. An intersection portion of the gate bus line 1 with the source bus line 2 also serves as a gate region. A drain D of the TFT 4 is connected via a contact hole portion 4A to the conductive material projecting portion 12D, while a source S of the TFT 4 is connected via a contact hole portion 4B to the source bus line 2. The drain region D of the TFT 4 is also connected directly to the extending portion 12. Thus, by causing a portion of the TFT 4 to overlap the source bus line 2, a space is provided so that the drain disconnect site P and the additive-capacitor disconnect site Q can be more stably cut off.

The conductive material projecting portion 12D is connected via a contact hole portion 3A to the pixel electrode 3. The conductive material projecting portion 7D is connected via the contact hole portion 2A to the source bus line 2.

The conductive material projecting portion 12D and the conductive material projecting portion 7D overlap each other via the interlayer film 14, resulting in a short-circuit site 7E.

The additive-capacitor disconnect site Q is disposed between the contact hole portion 4A and an additive-capacitor electrode portion (facing the broad-width portion 5A) of the extending portion 12. The drain disconnect site P is disposed between the drain region D of the TFT 4 and the contact hole portion 4A.

When an abnormality occurs in the TFT 4 or a current leakage occurs between the gate bus line 1 (or the source bus line 2) and the pixel electrode 3 (or the additive-capacitor electrode), a point defect is detected. In this case, by applying laser radiation to a corner portion including an overlapping portion of the conductive material projecting portion 12D and the conductive material projecting portion 7D, the conductive material projecting portion 12D and the conductive material projecting portion 7D are short-circuited.

In addition, the drain disconnect site P and the additive-capacitor disconnect site Q are similarly disconnected by laser irradiation. For example, YAG laser light is used which creates a laser spot R in the shape of a square of 5 μm×5 μm. After laser irradiation, a circuit diagram of FIG. 9A is changed into that of FIG. 10B. FIG. 10A is a cross-sectional view of the circuit diagram of FIG. 10B.

When the additive-capacitor disconnect site Q is disconnected, the pixel electrode 3 and the source bus line 2 are not influenced by the defect of the additive-capacitor portion (the broad-width portion 5A and the additive-capacitor electrode portion of the extending portion 12). When the drain disconnect site P is disconnected, the pixel electrode 3 and the source bus line 2 are not influenced by the defect of the TFT 4.

An exemplary defect of the additive-capacitor portion which is repaired by laser irradiation of the additive-capacitor disconnect site Q, will be described below. The potential of the conductive material layer (the broad-width portion 5A of the additive-capacitor bus line 5, made of the same material as the conductive material 7D) is different from the potential of a source signal on the source bus line 2. Therefore, when the broad-width portion 5A and the pixel electrode 3 are short-circuited via the extending portion 12, a pixel becomes a luminous point or a black point irrespective of the display state (black display, white display, etc.) even if short-circuiting is performed at the short-circuit site 7E. In this case, by disconnecting the additive-capacitor disconnect site Q, it is possible to prevent a pixel from becoming a luminous point or a black point.

An exemplary defect of the TFT 4 which is repaired by laser irradiation of the drain region disconnect site P, will be described below. The potential of the conductive material layer (the gate bus line 1, made of the same material as the conductive material 7D) is different from the potential of a source signal of the source bus line 2. Therefore, when the gate bus line 1 and the pixel electrode 3 are short-circuited via the extending portion 12, a pixel becomes a luminous point or a black point irrespective of the display state (black display, white display, etc.) even if short-circuiting is performed at the short-circuit site 7E. In this case, by disconnecting the drain region disconnect site P, it is possible to prevent a pixel from becoming a luminous point or a black point.

Note that when a polycrystalline silicon thin film transistor is used as the TFT 4, an off current is larger than when amorphous silicon is used. Therefore, a TFT 4 having dual gates or triple gates is typically formed, resulting in an increase in the probability of an occurrence of a defect in the TFT 4. Therefore, when polycrystalline silicon is used as the semiconductor layer in the TFT 4, a significant effect can be expected by providing the drain region disconnect site P in the TFT 4.

In Embodiment 5, the switching element 4 has a top gate structure. Alternatively, the switching element 4 may have a bottom gate structure. The switching element 4 may have a single gate structure or a structure having three or more gates.

Figure 12:
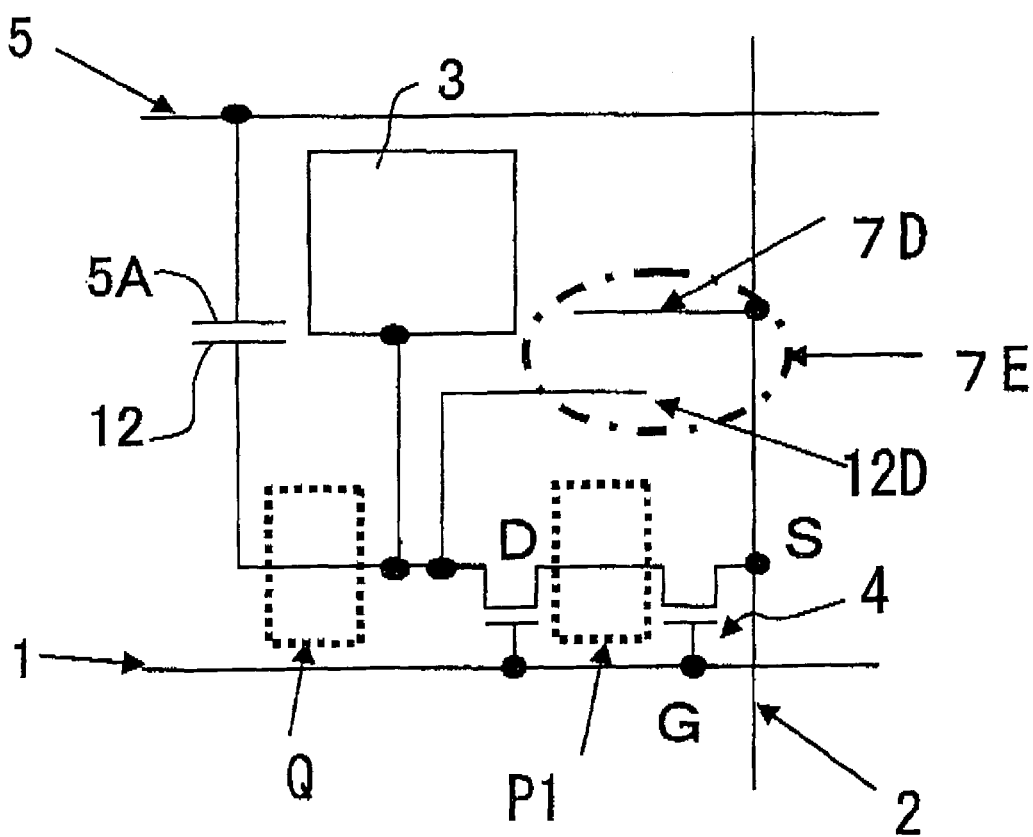
FIG. 12 is a circuit diagram schematically showing another exemplary basic unit of an active matrix substrate different from that of FIG. 9A.

Further, in Embodiment 5, the drain disconnect site P is provided at a portion of the dual gates closest to the pixel electrode 3. Alternatively, as shown in FIG. 12, a disconnect site P1 may be provided at any site in a drain region (e.g., a drain region between the gates), depending on the state of a defect of the TFT 4, the arrangement of the TFT 4, or the like. A disconnect site may be provided in a source region.

Further, in Embodiment 5; the conductive material projecting portions 7D and 12D constituting the short-circuits site 7E may be any existing or new conductive material layer (including the extending portion 12).

Further, in Embodiment 5, the conductive material layer is provided on the interlayer film 14, and the resin layer 15 is interposed between the conductive material layer and the pixel electrode 3. Alternatively, the pixel electrode 3 may be provided on the interlayer film 14 interposed, and the resin layer 15 may not be provided between the conductive material layer and the pixel electrode 3.

Further, Embodiment 5 describes the short-circuit site 7E at which the conductive material layer projecting portion 12D (herein made of the same material as that of the source bus line 2) connected to the drain region D of the TFT 4 and the conductive material layer projecting portion 7D (herein made of the same material as that of the gate bus line 1) connected to the source bus line 2 overlap each other, having the interlayer film 14 interposed therebetween; the additive-capacitor disconnect site Q at which the additive-capacitor electrode and the pixel electrode 3 are electrically disconnected; and the drain region disconnect site P at which the drain region D and the pixel electrode 3 are electrically disconnected. The present invention is not limited to this. Only the short-circuit site 7E and the additive-capacitor disconnect site Q may be provided and disconnection may be performed only at these sites. Alternatively, only the short-circuit site 7E and the drain region disconnect site P may be provided and disconnection may be performed only at these sites.

Embodiment 6

In the above-described Embodiment 5, the conductive material layer projecting portion 12D and the conductive material layer projecting portion 7D are short-circuited by destroying the interlayer film 14 (insulator) therebetween. In addition, at least one of the drain region disconnect site P and the additive-capacitor disconnect site Q is disconnected. In Embodiment 6, a first projecting portion (a semiconductor layer projecting portion 12A or a conductive material layer projecting portion 12B) and a second projecting portion 7 (or 7B) are easily short-circuited by destroying a thin gate insulating film 13 therebetween. In this case, although stray capacitance is larger than when the interlayer film 14 is used as an insulating film as in the above-described Embodiment 5, short-circuit can be more easily achieved.

Referring to FIG. 13, in Embodiment 6, a drain region disconnect site P1 is further provided in the active matrix substrate 110 of FIG. 1A. The drain region disconnect site P1 is located in a drain region of a gate. For a pixel portion in which a point defect caused by the defect of a TFT 4 is detected, laser radiation is applied to an overlapping portion of a semiconductor layer projecting portion 12A and a gate metal projecting portion 7, while laser radiation is applied to the drain electrode disconnect site P1.

The drain disconnect site P1 is also disconnected by laser irradiation. For example, YAG laser light is used for laser irradiation. The laser spot R may be generally in the shape of a circle having a diameter of several micrometers or a square having a side of several micrometers. In Embodiment 5, for example, a square of 5 μm×5 μm is used as the laser spot R.

Thus, by short-circuiting the semiconductor layer projecting portion 12A and the gate metal projecting portion 7 as described above and disconnecting the drain disconnect site P1, a source signal (image signal) is input from the source bus line 2 directly to the pixel electrode 3 irrespective of a gate signal from the gate bus line 1 and without a defect of the TFT 4 influencing the pixel electrode 3 or the source bus line 2. As a result, the defective pixel portion is displayed as neither a completely luminous point nor a completely black point. Therefore, a defective pixel portion, which has been subjected to the above-described repair treatment (melt treatment), is not easily recognized visually as a defect, though it does not work normally. In other words, such a defective pixel is in an intermediate display state. Therefore, such a defective pixel can be said to be a normal pixel in terms of screen display.

As described above, according to Embodiment 6, even if a pixel defect occurs, a defective pixel can be easily repaired by performing laser irradiation once and with less power to short-circuit the source bus line 2 and the pixel electrode 3, compared to conventional techniques requiring performing laser irradiation three times and with higher power. Therefore, the production yield can be improved and the production cost can be reduced. Further, by disconnecting the drain disconnect site P, the pixel electrode 3, the source bus line 2, and the like are not influenced by a defect of the TFT 4.

Figure 14:
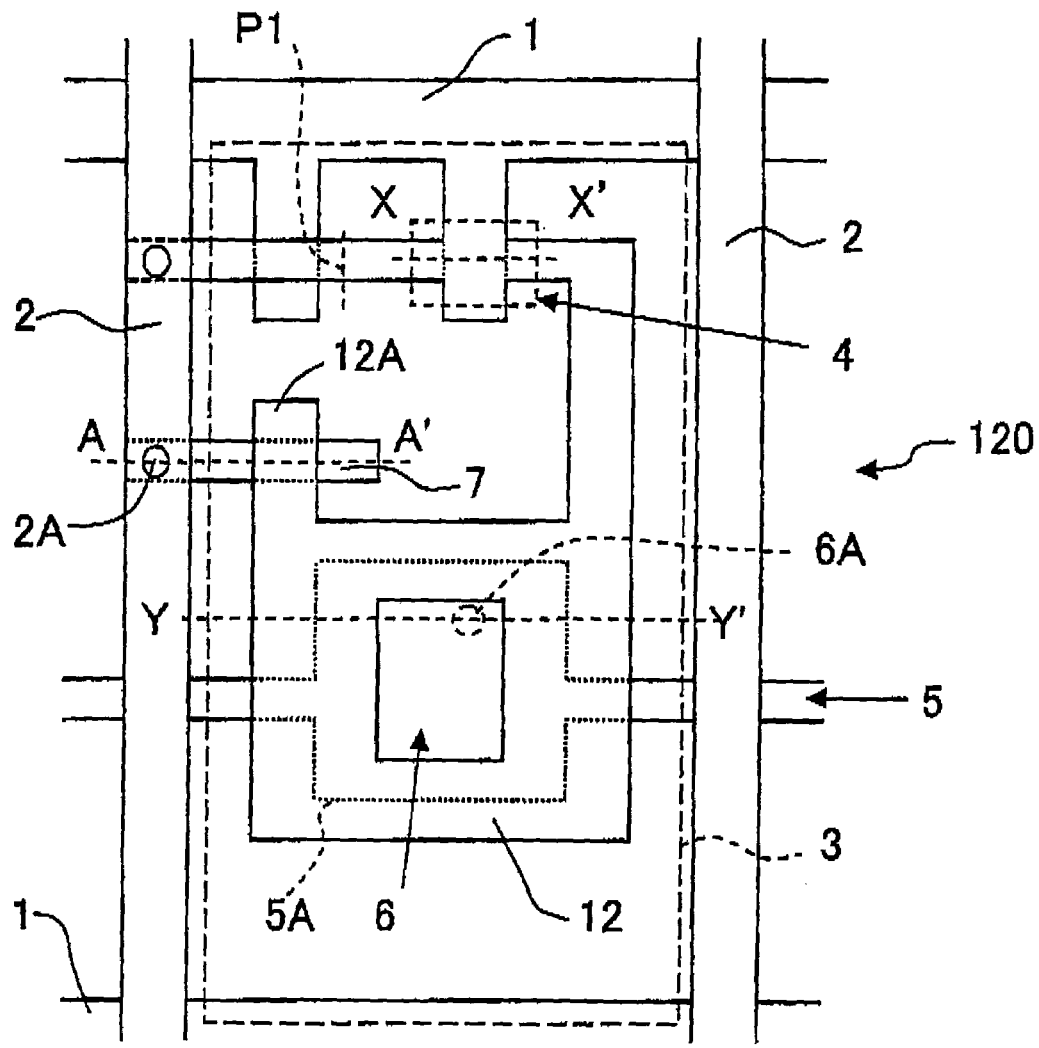
FIG. 14 is a top view showing an exemplary structure of a basic unit in an active matrix substrate in the active type liquid crystal display apparatus according to Embodiment 6 of the present invention.
Figure 15:
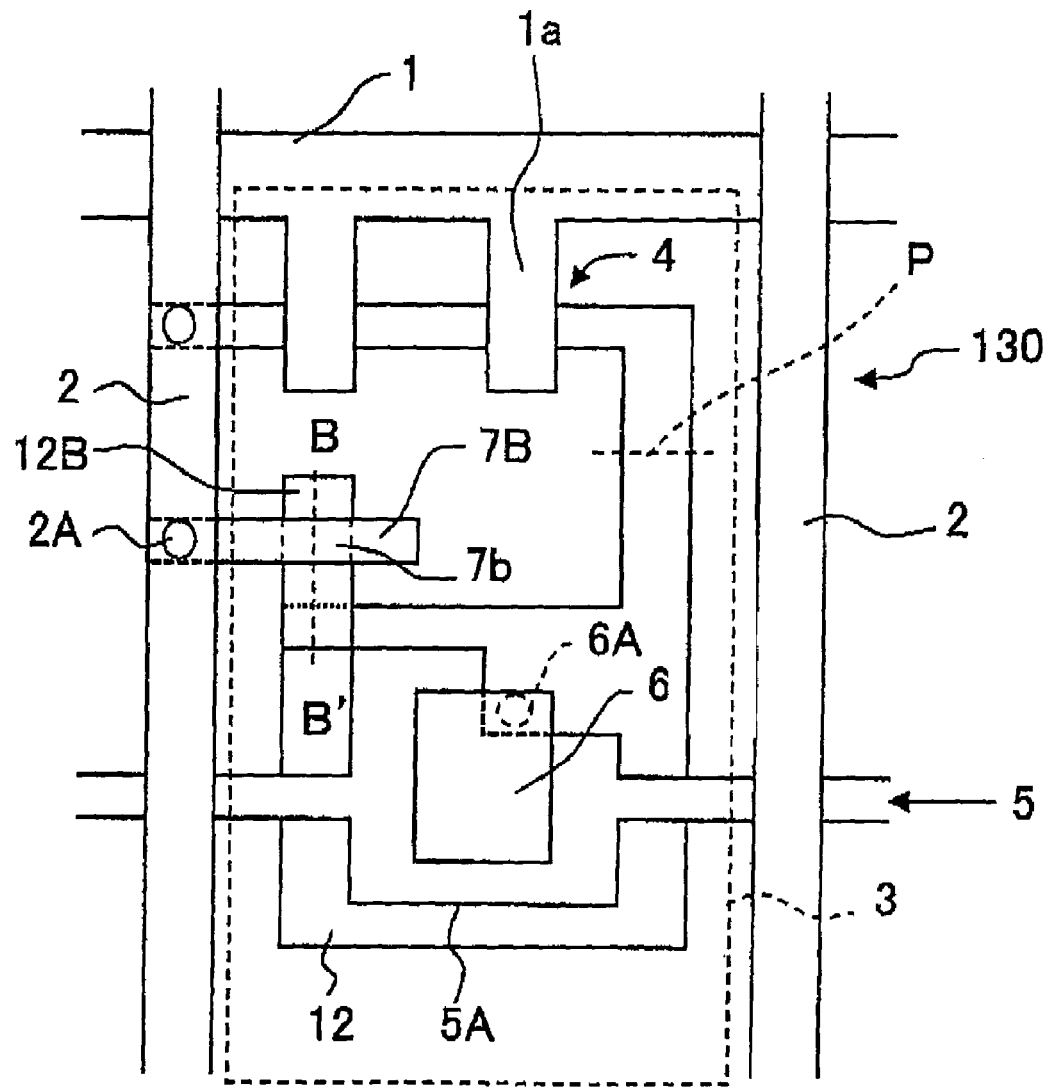
FIG. 15 is a top view showing an exemplary structure of a basic unit in an active matrix substrate in the active type liquid crystal display apparatus according to Embodiment 6 of the present invention.

The active matrix substrate 120 further having a drain region disconnect site P1 is shown in FIG. 14. The active matrix substrate 130 further having a drain region disconnect site P is shown in FIG. 15. These active matrix substrates 120 and 130 can have an effect similar to that described above.

Embodiment 7

In the above-described Embodiment 5, the conductive material layer projecting portion (first layer) 12D and the conductive material layer projecting portion (second layer) 7D are short-circuited by destroying the interlayer film 14 therebetween. In Embodiment 7, the first layer is not connected directly to the switching element. An overlapping portion of the first layer 12E connected to the pixel electrode 3 and the conductive material layer projecting portion (second layer) 7D connected to the source bus line 2 is short-circuited by destroying an insulating film (insulator) therebetween.

Figure 16A:
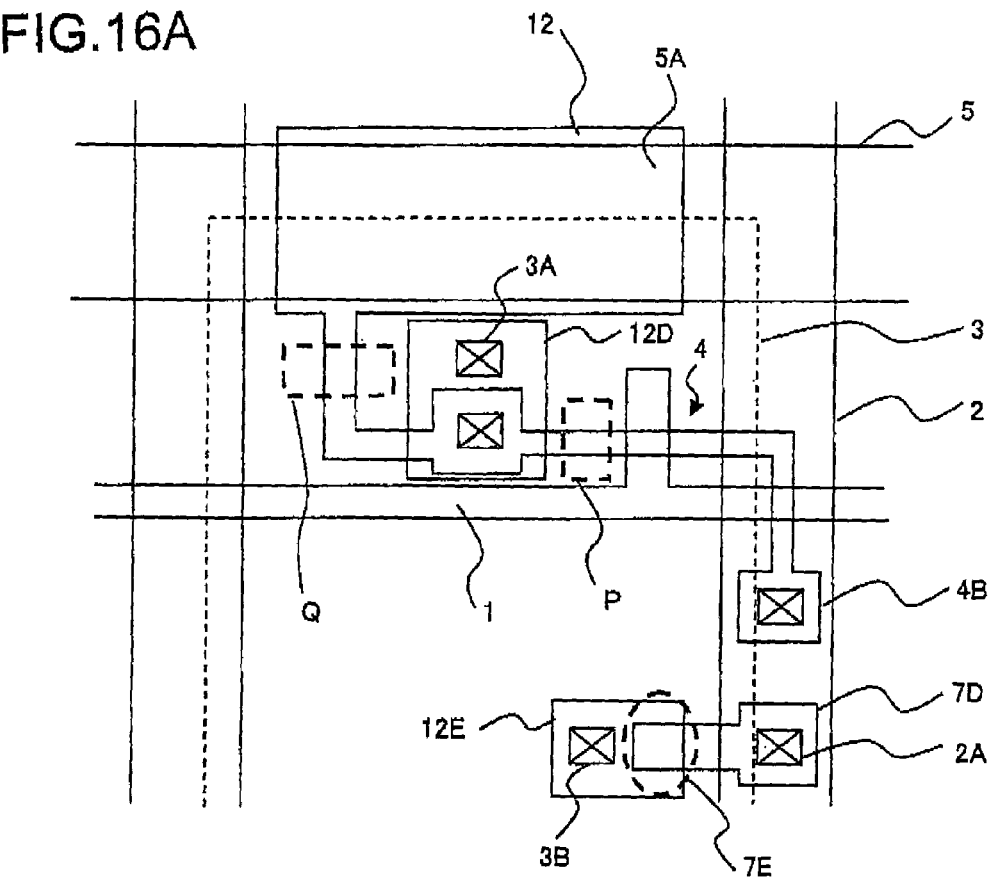
FIG. 16A is a top view showing an exemplary structure of a basic unit in an active matrix substrate in an active type liquid crystal display apparatus according to Embodiment 7 of the present invention.
Figure 16B:
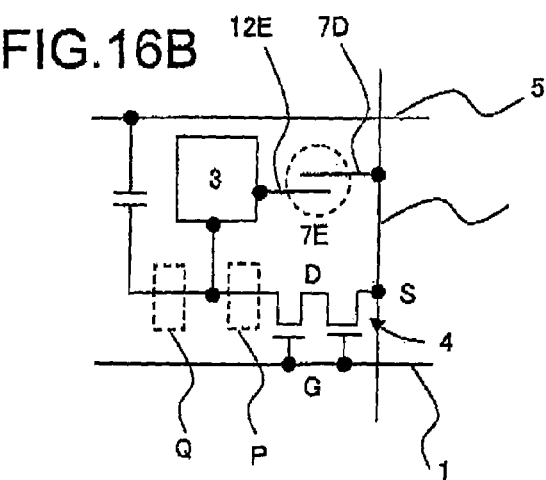
FIG. 16B is a circuit diagram schematically showing the basic unit of FIG. 16A.

FIG. 16A is a top view showing an exemplary structure of a basic unit in an active matrix substrate, which is one of a pair of substrates facing each other and having a liquid crystal layer interposed between them, in an active type liquid crystal display apparatus according to Embodiment 7 of the present invention. FIG. 16A is a circuit diagram schematically showing the basic unit. Note that parts of FIG. 16A having substantially the same functions and effects as those of parts of FIGS. 9A and 11A are indicated by the same reference numerals and will not be explained in detail. In FIG. 16A, a TFT 4 has a single gate structure. In FIG. 16B, a TFT 4 has a dual gate structure. The TFT 4 may have either the single gate structure or the dual gate structure.

In FIGS. 16A and 16B, a first layer 12E made of a conductive material layer (or a semiconductor layer) is separated from a conductive material layer projecting portion 12D and is independently formed. The first layer 12E is connected to a pixel electrode 3 via a contact hole 3B which is not different from the contact hole 3A.

In an active type liquid crystal display apparatus comprising the active matrix substrate of FIG. 16A, if an abnormality occurs in the TFT 4 or a current leakage occurs between a bus line (a gate bus line 1 or a source bus line 2) and the pixel electrode 3 (or an additive-capacitor electrode), a portion (short-circuit site) 7E including an overlapping portion of the first layer 12E and a conductive material projecting portion 7D is short-circuited by laser irradiation. In addition, a drain disconnect site P and an additive-capacitor disconnect site Q are similarly short-circuited by laser irradiation. In order to repair a defective pixel, laser irradiation is performed from a glass side (a bottom side of the TFT 4) of the active matrix substrate, since the active matrix substrate having the TFT 4 is already attached to a counter substrate.

Thus, when the source bus line 2 and the pixel electrode 3 are short-circuited, a source signal is input directly from the source bus line 2 to the pixel electrode 3 irrespective of a gate signal (scanning signal) from the gate bus line 1. As a result, a repaired pixel portion is displayed as neither a completely luminous point nor a completely black point. For example, when black display is performed on an entire screen, a black display potential is applied to the source bus line 2 and a black display voltage is applied to a pixel portion. When white display is performed on an entire screen, pixel portions are displayed white. Although a pixel portion (pixel electrode 3) repaired as described above does not work normally, the repaired pixel is not easily recognized by human vision as a display defect.

Further, by disconnecting the additive-capacitor disconnect site Q, the pixel electrode 3 and the source bus line 2 are not influenced by a defect of an additive-capacitor portion. Furthermore, by disconnecting the drain disconnect site P, the pixel electrode 3, the source bus line 2, and the like are not influenced by a defect of the TFT 4.

In FIG. 16A, a repair element composed of the contact hole 3B, the first layer 12E, the conductive material layer projecting portion 7D and the contact hole 2A, can be provided separately from the TFT 4 serving as a switching element. Therefore, such a repair element has a high degree of freedom in design, and can be easily adapted to a design having a number of constraints.

In Embodiment 7, the first layer 12E and the conductive material layer projecting portion 7D are short-circuited by destroying an insulating film therebetween. In Embodiment 7, at least one of the connection between the first layer 12E and the pixel electrode 3 and the connection between the conductive material layer projecting portion 7D and the source bus line 2 may be established via a contact hole portion.

Embodiment 8

In the above-described Embodiments 1 to 7, a pixel electrode evenly covers a pixel. In Embodiment 8, an active matrix substrate has a structure, in which a slit is formed in a pixel electrode or a structure, in which a pixel electrode comprises a plurality of electrodes (a vertical alignment mode, an in-plane switching (IPS) mode, etc.). A luminous display can be achieved by optimizing a positional relationship between a repair element and the slit or the electrode.

Figure 17:
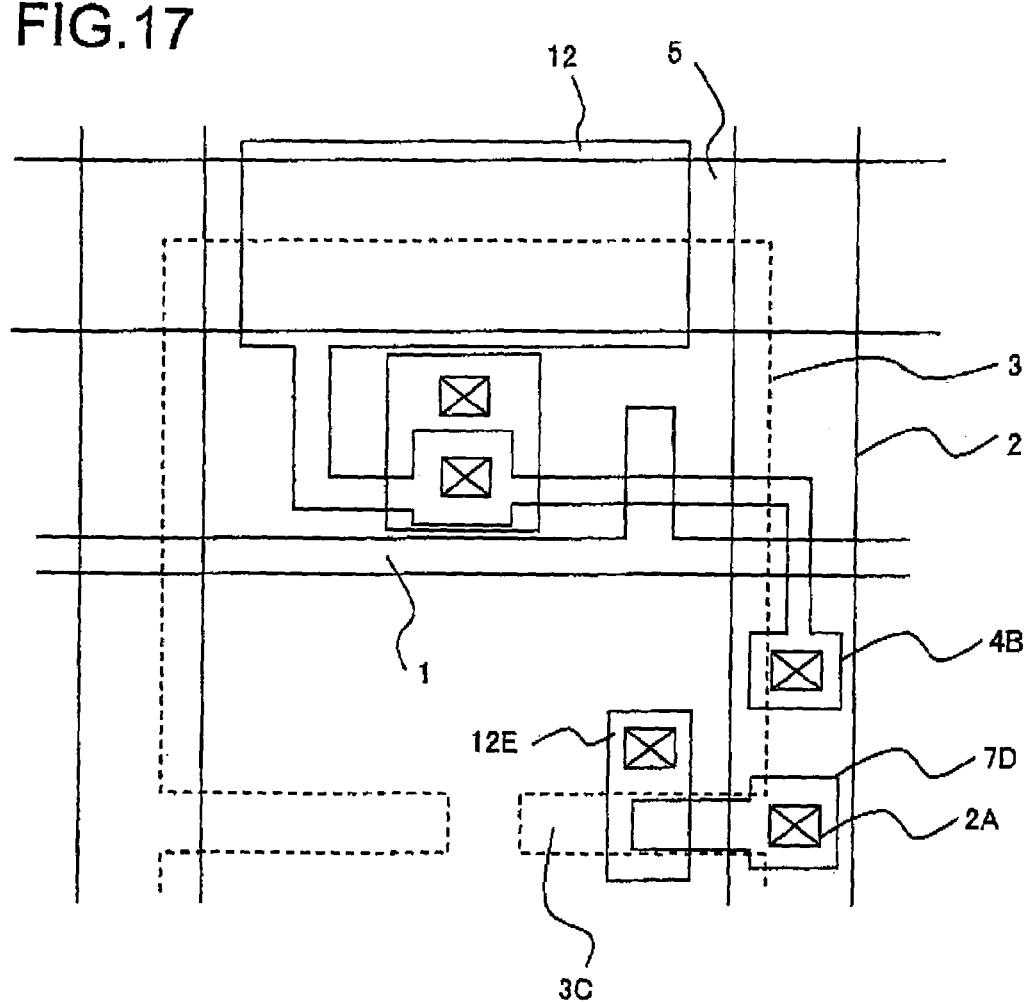
FIG. 17 is a top view showing an exemplary structure of an active matrix substrate for use in an active type liquid crystal display apparatus according to Embodiment 8 of the present invention, which has a normally black vertical alignment mode.

FIG. 17 is a top view showing an exemplary active matrix substrate of an active type liquid crystal display apparatus having a normally black vertical alignment mode. Note that parts of FIG. 17 having substantially the same functions and effects as those of parts of FIG. 16A are indicated by the same reference numerals.

In FIG. 17, a pixel electrode 3 is provided with a slit 3C for defining an orientation control direction of a liquid crystal layer. At the slit 3C portion, when a voltage is applied, liquid crystal molecules in the liquid crystal layer are tilted by an electric field of a neighboring portion of the pixel electrode 3. Therefore, the orientation of liquid crystal molecules can be controlled. In this structure, liquid crystal molecules in the slit 3C portion are not tilted, so that the transmittance is low. Therefore, the influence of the slit 3C portion on display is small.

As shown in FIG. 17, a portion of the conductive material layer projecting portion (second layer) 7D is caused to overlap the slit 3C portion, thereby making it possible to suppress a reduction in transmittance due to the arrangement of a repair element to a low level. The pixel electrode 3 is made of a transparent conductive film. A portion of the conductive material layer projecting portion 7D is provided immediately below (or under) the slit 3C provided in the pixel electrode 3, overlapping the slit 3C. A portion of the first layer 12E (conductive material layer projecting portion) is preferably extended to below the slit 3C, overlapping the slit 3C. An overlapping portion of the first layer 12E connected to the pixel electrode 3 and the conductive material layer projecting portion 7D connected to the source bus line 2, is disposed immediately below (or under) the slit 3C.

In the slit 3C portion, a substantially middle portion provides the darkest display. Therefore, it is preferable that a center line of the slit 3C is made closer to a center line of the overlapping portion of the conductive material layer projecting portion 7D. For example, a distance between the two center lines is preferably within the range between 0 μm and 3 μm, inclusive. More preferably, the two center lines coincide. In this case, the reduction of the transmittance can be minimized. It is also preferable that the center line of the slit 3C is closer to a center line of the overlapping portion of the first layer 12E. For example, a distance between the two center lines is preferably within the range between 0 μm and 3 μm, inclusive. More preferably, the two center lines coincide. In this case, the reduction of the transmittance can be minimized.

In FIG. 17, a portion of the conductive material layer projecting portion 7D is disposed below the slit 3C provided in the pixel electrode 3. The present invention is not limited to this. A portion of the conductive material layer projecting portion 7D may be disposed above the slit 3C. Alternatively, at least one of the first layer 12E and the second layer 7D is disposed above or below the slit 3C.

Figure 18:
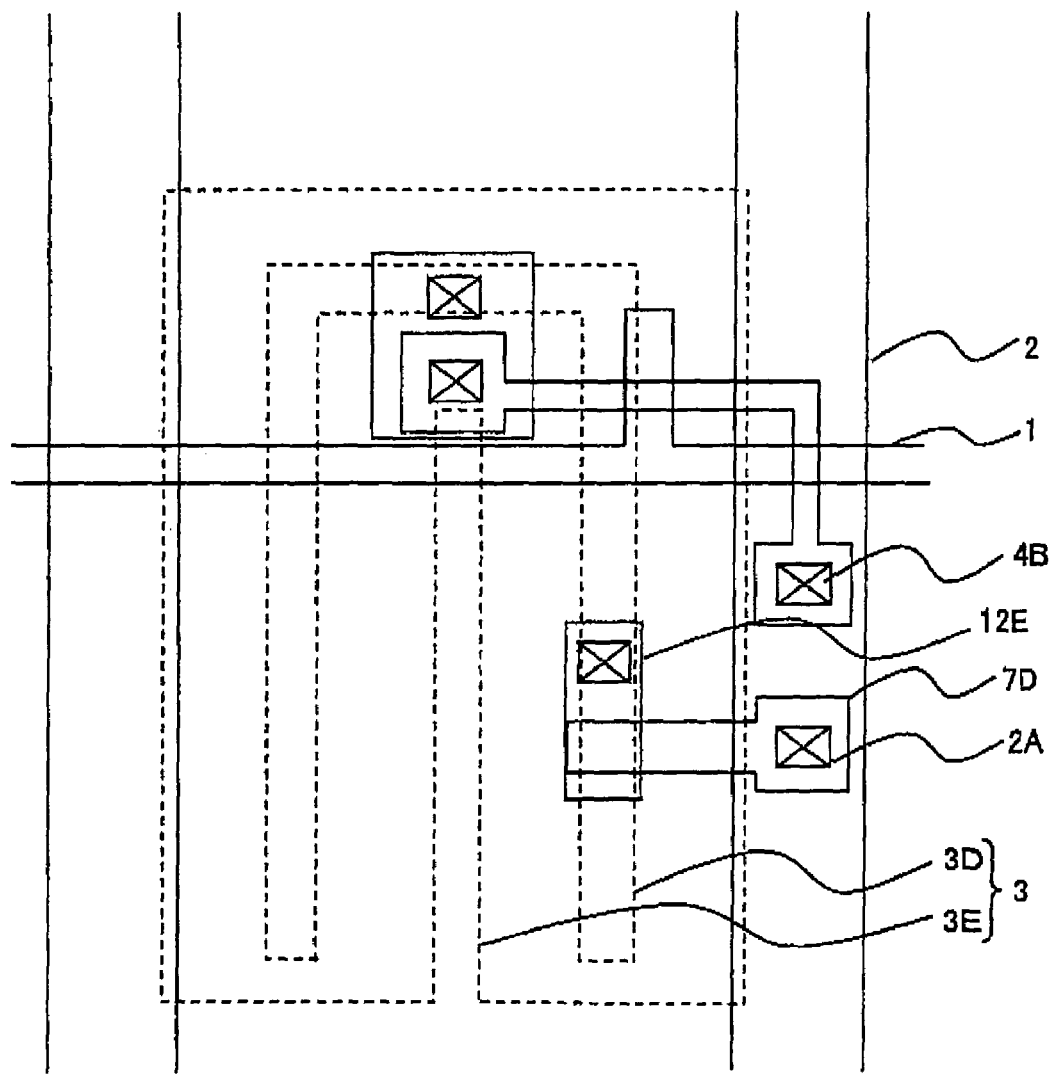
FIG. 18 is a top view showing an exemplary structure of an active matrix substrate for use in an active type liquid crystal display apparatus according to Embodiment 8 of the present invention, which has a normally black IPS mode.

FIG. 18 is a top view showing an exemplary active matrix substrate in an active type liquid crystal display apparatus having a normally black vertical alignment mode. Note parts of FIG. 18 having substantially the same functions and effects as those of FIG. 16A are indicated by the same reference numerals.

In FIG. 18, a pixel electrode 3 includes a plurality of electrodes capable of applying potentials different from one another, i.e., a first electrode 3D and a second electrode 3E. A liquid crystal layer is driven by an in-plane electric field between the first electrode 3D and the second electrode 3E.

When a voltage is applied, liquid crystal molecules between the first electrode 3D and the second electrode 3E are driven by an influence of an in-plane electric field, so that light is transmitted. In a portion above an electrode, the orientations of liquid crystal molecules compete with one another, so that the liquid crystal molecules are not moved. Therefore, a display is dark. In this case, when an electrode is not transparent, light is not transmitted.

Therefore, as shown in FIG. 18, a first layer 12E is disposed immediately below (or under) the first electrode 3D, overlapping the first electrode 3D, thereby making it possible to suppress a reduction in transmittance due to the arrangement of a repair element. The pixel electrode 3 is made of a transparent conductive film. A portion of the first layer 12E is provided immediately below (or under) the slit 3C provided in the pixel electrode 3, overlapping the first electrode 3D. A portion of the conductive material layer projecting portion 7D (second layer) is preferably extended to below the first electrode 3D, overlapping the first electrode 3D. An overlapping portion of the first layer 12E connected to the first electrode 3D and the conductive material layer projecting portion 7D connected to the source bus line 2, is disposed immediately below (or under) the first electrode 3D.

In the first electrode 3D, a substantially middle portion provides the darkest display. Therefore, it is preferable that a center line of the first electrode 3D (center line extending in a longitudinal direction) is made closer to a center line of the overlapping portion of the first layer 12E. For example, a distance between the two center lines is preferably within the range between 0 μm and 3 μm, inclusive. More preferably, the two center lines coincide. In this case, the reduction of the transmittance can be minimized. It is also preferable that the center line of the first electrode 3D (center line extending in a longitudinal direction) is closer to a center line of the overlapping portion of the conductive material layer projecting portion 7D. For example, a distance between the two center lines is preferably within the range between 0 μm and 3 μm, inclusive. More preferably, the two center lines coincide. In this case, the reduction of the transmittance can be minimized.

The first layer 12E may be disposed below the second electrode 3E (not shown in FIG. 18). Thereby, a reduction in transmittance due to the arrangement of a repair element can be minimized. In this case, the conductive material layer projecting portion 7D is extended to below the second electrode 3E of the first layer 12E.

In FIG. 18, a portion of the first layer 12E is disposed below the first electrode 3D. The present invention is not limited to this. A portion of the first layer 12E may be disposed above the first electrode 3D. Alternatively, a portion of at least one of the first layer 12E and the conductive material layer projecting portion 7D may be disposed above or below the first electrode 3D. The first layer 12E and the conductive material layer projecting portion 7D are herein assumed to be made of a non-transparent material. Even when the first layer 12E and the conductive material layer projecting portion 7D are made of a transparent material, transmittance of light through first layer 12E and the conductive material layer projecting portion 7D causes the light to be darker. In order to achieve a more luminous display, it is preferable that the first layer 12E and the conductive material layer projecting portion 7D are disposed in a portion which does not contribute to display (slit portion or the plurality of electrodes).

In FIGS. 17 and 18 of Embodiment 8, a switching element (TFT 4) and the first layer 12E made of a semiconductor layer or a conductive material layer are not connected directly to each other but via the pixel electrode 3D and a contact hole portion, as in FIGS. 16A and 16B of Embodiment 7. As shown in FIGS. 9A and 9B, the conductive material layer projecting portion (first layer) 12D projecting from the drain region D of the TFT 4 and the conductive material layer projecting portion (second projecting portion) 7D projecting from the source bus line 2 are short-circuited by destroying the interlayer film 14 therebetween. In this case, when a display apparatus has a vertical alignment mode or an IPS mode, a more luminous display can be achieved by optimizing the positional relationship between a repair element and a slit or an electrode.

In the above-described embodiments, a display apparatus is a liquid crystal display apparatus having a liquid crystal as a display medium. The present invention is not limited to this. The present invention can be applied to a display apparatus using an EL light emitting layer or a plasma light emitting material. In Embodiments 1 to 8, an active type liquid crystal display apparatus, in which a thin film transistor (TFT 4) is used as a switching element, has been described. The present invention is not limited to this. The present invention can be applied to various display apparatuses, such as a liquid crystal display apparatus using an MIM element, a diode element, a MOS transistor, or the like. In Embodiment 4, a switching element (TFT 4) has a dual gate structure and a top gate structure. The switching element may have a bottom gate structure, or a single gate structure or a structure having three or more gates.

In the above-described embodiments, YAG laser light is applied to a corner portion including an overlapping portion of a first projecting portion and a second projecting portion to short-circuit the first projecting portion and the second projecting portion. The present invention is not limited to this. The first projecting, portion and the second projecting portion can be short-circuited by irradiating thermal energy, such as laser light (laser beam) or the like, as well as YAG laser light.

In the above-described embodiments, the second projecting portion has a multilayer structure made of tantalum nitride and tungsten. Alternatively, a metal material (e.g., Ta, W, Ti, Mo, Al, Co, etc.), an alloy material or a compound material including these metal elements as a major component, or the like, may be used to form the second projecting portion. Briefly, the material for the second projecting portion is any material that has good compatibility for short-circuiting in combination with the first projecting portion (electrical connection) and that is easy to short-circuit efficiently and certainly.

In the above-described embodiments, a conductive material (the source bus line 2 and the conductive material projecting portion 12D) is disposed on the interlayer film 14, and the resin layer 15 is provided between the conductive material and the pixel electrode 3. The present invention is not limited to this. Alternatively, the source bus line 2 and the conductive material projecting portion 12D may be provided on the interlayer film 14; and the pixel electrode 3 may be disposed immediately above only the conductive material projecting portion 12D; the resin layer 15 need not be provided between the conductive material projecting portion 12D and the pixel electrode 3; and the conductive material projecting portion 12D and the pixel electrode 3 may be electrically connected to each other. In this case, the source bus line 2 is separated from the pixel electrode 3. Further, the interlayer film 14 may be made of a plurality of layers (e.g., two layers, etc.).

In FIG. 5B, the contact hole portion 6A may be formed in only the interlayer film 14; the source metal 6 may be provided directly on the interlayer film 14; and the semiconductor layer extending portion 12 and the source metal 6 may be electrically connected to each other via the contact hole portion 6A. In this case, a new contact hole portion is formed in the resin layer 15 on the source metal 6. The pixel electrode 3 is provided on the resin layer 15. The source metal 6 and the pixel electrode 3 are electrically connected to each other via the new contact hole portion. Therefore, the contact hole portion can be made shallow, so that an area occupied by a single contact hole portion can be made small and the contact stability of upper and lower layers via the contact hole portion can be improved.

In the above-described embodiment, the first projecting portion projecting from the extending portion 12 and the second projecting portion projecting from the source bus line 2 have been described. At least one of the first projecting portion and the second projecting portion need not be a projecting portion.

In the above-described embodiments, the width and thickness of a line disconnecting portion are not changed at the disconnect sites P and Q. Alternatively, the width or thickness of the disconnect site may be reduced in order to facilitate disconnection by laser irradiation, taking into consideration the relationship between the width or thickness and a current capacitance. In this case, disconnection by laser irradiation is facilitated, and guidance for a portion to be disconnected is provided, thereby making it possible to improve the success rate of disconnection. In order to change a line width, for example, the shape of a disconnect site can be modified in various manners. For example, a semicircular notch may be formed in a disconnect site. A colored resin material may be provided as a mark at a rear of a disconnect site.

According to the present invention, a defective pixel can be easily repaired by performing laser irradiation a smaller number of times, depending on the type of a pixel defect, so that the defective pixel is not readily viewed or recognized, and therefore, the production yield can be improved, in the field of image display apparatuses, such as liquid crystal televisions, computer terminal display apparatuses, and the like.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. An active substrate, comprising:
    a switching element comprising a first drive region and a second drive region, a signal line being connected to the first drive region;
    a pixel electrode connected to the second drive region;
    a first layer comprising at least one of a semiconductor material and a conductive material, and connected to the pixel electrode;
    a second layer comprising at least one of a semiconductor material and a conductive material, and connected to the signal line; and
    an insulating film provided between the first layer and the second layer,
    wherein at least a portion of the first layer and at least a portion of the second layer overlap each other so that the first layer and the second layer are short-circuited by applying first energy to the insulating film.

2. An active substrate according to claim 1, further comprising:
    a scanning line intersecting the signal line,
    wherein the switching element further comprises a control region connected to the scanning line.

3. An active substrate according to claim 1, further comprising:
    a first contact hole portion for connecting the second drive region and the pixel electrode.

4. An active substrate according to claim 1, further comprising:
a first contact hole portion for connecting the second drive region and the first layer; and
a second contact hole portion for connecting the first layer and the pixel electrode.

5. An active substrate according to claim 1, further comprising:
an additive-capacitor line,
wherein the second drive region comprises an extending portion extending from the switching element, and
at least a portion of the extending portion and a portion of the additive-capacitor line face each other.

6. An active substrate according to claim 3, further comprising:
a second contact hole portion for connecting the second layer and the signal line.

7. An active substrate according to claim 4, further comprising:
a third contact hole portion for connecting the second layer and the signal line.

8. An active substrate according to claim 1, wherein:
the second drive region comprises an extending portion extending from the switching element; and
the first layer projects from the extending portion.

9. An active substrate according to claim 4, wherein the first layer is a conductive material layer.

10. An active substrate according to claim 1, wherein the insulating film is a gate insulating film.

11. An active substrate according to claim 9, wherein the insulating film is an interlayer film.

12. An active substrate according to claim 1, further comprising:
a scanning line intersecting the signal line,
wherein a material for the second layer is the same as a material for the scanning line.

13. An active substrate according to claim 1, wherein a portion of the first layer and a portion of the second layer are projected from an overlapping portion of the first layer and the second layer.

14. An active substrate according to claim 1, wherein the switching element is one of a thin film transistor element, an MIM element, a MOS transistor element, and a diode.

15. An active substrate according to claim 14, wherein the thin film transistor element is a polycrystalline silicon thin film transistor.

16. An active substrate according to claim 14, wherein the thin film transistor element has a top gate structure.

17. An active substrate according to claim 14, wherein the thin film transistor element has a bottom gate structure.

18. An active substrate according to claim 1, wherein at least one of the first layer and the second layer comprises semiconductor silicon.

19. An active substrate according to claim 1, wherein at least one of the first layer and the second layer is made of a metal material, an alloy material and a compound material including at least one element of Ta, W, Ti, Mo, Al and Cu.

20. An active substrate according to claim 1, wherein the second drive region and the first layer are integrated with each other.

21. An active substrate according to claim 1, further comprising:
an additive-capacitor portion connected to the pixel electrode; and
at least one of a first disconnect site and a second disconnect site,
wherein the second drive region and the pixel electrode are electrically separated from each other by applying second energy to the first disconnect site, and
the additive-capacitor portion and the pixel electrode are electrically separated from each other by applying third energy to the second disconnect site.

22. An active substrate according to claim 1, further comprising:
a scanning line intersecting the signal line,
wherein a material for the first layer is the same as a material for the signal line, and
a material for the second layer is the same as a material for the scanning line.

23. An active substrate according to claim 1, further comprising:
a scanning line intersecting the signal line,
wherein at least a portion of the switching element overlaps the signal line, and
an intersecting region of the scanning line with the signal line also serves as a gate region of the switching element.

24. An active substrate according to claim 23, wherein:
the switching element is in the shape of an L;
a first portion of the switching element overlaps the signal line; and
a second portion of the switching element overlaps the pixel electrode.

25. An active substrate according to claim 1, further comprising:
at least one of a first contact hole portion for connecting the first layer and the pixel electrode and a second contact hole portion for connecting the second layer and the signal line.

26. An active substrate according to claim 1, wherein:
the pixel electrode comprises a transparent conductive film having a slit; and
a portion of at least one of the first layer and the second layer overlaps the slit.

27. An active substrate according to claim 26, wherein:
a portion of the first layer overlaps the slit; and
a distance between a center line of the portion of the first layer and a center line of the slit is within a range between 0 μm to 3 μm, inclusive.

28. An active substrate according to claim 26, wherein:
a portion of the second layer overlaps the slit; and
a distance between a center line of the portion of the second layer and a center line of the slit is within a range between 0 μm to 3 μm, inclusive.

29. An active substrate according to claim 26, wherein a center line of a portion of at least one of the first layer and the second layer coincides with a center line of the slit.

30. An active substrate according to claim 1, wherein:
the pixel electrode comprises a plurality of electrodes; and
a portion of at least one of the first layer and the second layer overlaps at least one of the plurality of electrodes.

31. An active substrate according to claim 30, wherein:
a portion of the first layer overlaps a predetermined electrode of the plurality of electrodes; and
a distance between a center line of the portion of the first layer and a center line of the predetermined electrode is within a range between 0 μm to 3 μm, inclusive.

32. An active substrate according to claim 30, wherein:
a portion of the second layer overlaps a predetermined electrode of the plurality of electrodes; and
a distance between a center line of the portion of the second layer and a center line of the predetermined electrode is within a range between 0 μm to 3 μm, inclusive.

33. An active substrate according to claim 30, wherein a center line of a portion of at least one of the first layer and the second layer coincides with a center line of the predetermined electrode of the plurality of electrodes.

34. A display apparatus, comprising:
an active substrate;
a counter substrate provided facing the active substrate; and
a display medium provided between the active substrate and the counter substrate,
wherein the active substrate comprises:
a switching element comprising a first drive region and a second drive region, a signal line being connected to the first drive region;
a pixel electrode connected to the second drive region;
a first layer containing at least one of a semiconductor material and a conductive material, connected to the pixel electrode;
a second layer containing at least one of a semiconductor material and a conductive material, connected to the signal line; and
an insulating film provided between the first layer and the second layer,
wherein at least a portion of the first layer and at least a portion of the second layer overlap each other so that the first layer and the second layer are short-circuited by applying first energy to the insulating film.

35. An display apparatus according to claim 34, wherein when it is determined that light output from the display apparatus via the pixel electrode is not normal, a short circuit is caused between the first layer and the second layer.

36. An display apparatus according to claim 34, wherein the display medium is one of a liquid crystal, an EL light emitting layer, and a plasma light emitting material.

37. A method for producing a display apparatus, wherein the display apparatus comprises:
an active substrate;
a counter substrate provided facing the active substrate; and
a display medium provided between the active substrate and the counter substrate, wherein the active substrate comprises:
a switching element comprising a first drive region and a second drive region, a signal line being connected to the first drive region;
a pixel electrode connected to the second drive region;
a first layer containing at least one of a semiconductor material and a conductive material, and connected to the pixel electrode;
a second layer containing at least one of a semiconductor material and a conductive material, and connected to the signal line; and
an insulating film provided between the first layer and the second layer,
wherein at least a portion of the first layer and at least a portion of the second layer overlap each other so that the first layer and the second layer are short-circuited by applying first energy to the insulating film,
wherein the method comprises the steps of:
determining whether or not light output from the display apparatus via the pixel electrode is normal; and
short-circuiting the first layer and the second layer by applying the first energy to the insulating film when it is determined that the output light is not normal.

38. An method according to claim 37, wherein:
a portion of the first layer and a portion of the second layer project from an overlapping portion of the first layer and the second layer; and
in the short-circuiting step, an amount of energy applied to the portions of the first layer and the second layer projecting from the overlapping portion is larger than an amount of energy applied to the overlapping portion.

39. An method according to claim 37, wherein the first energy is at least a portion of energy of laser light.

40. An method according to claim 37, wherein:
the active substrate further comprises:
an additive-capacitor portion connected to the pixel electrode; and
at least one of a first disconnect site and a second disconnect site,
wherein the second drive region and the pixel electrode are electrically separated from each other by applying second energy to the first disconnect site,
the additive-capacitor portion and the pixel electrode are electrically separated from each other by applying third energy to the second disconnect site, and
the method further comprises at least one of the steps of applying the second energy to the first disconnect site and applying the third energy to the second disconnect site, when it is determined that the output light is not normal.

41. An method according to claim 37, wherein the switching element is formed using the same material and in the same steps as those of switching elements contained in a scanning line drive section and a signal line drive section.

* * * * *